(12) United States Patent
Satoh et al.

(10) Patent No.: US 11,899,107 B2
(45) Date of Patent: Feb. 13, 2024

(54) DETECTION APPARATUS AND METHOD OF DETECTING OBJECT COMPRISING A CIRCUITRY TO SWITCH AN ILLUMINANCE LEVEL AT EACH ILLUMINANCE REGION WITH A PLURALITY OF ILLUMINANCE LEVELS

(71) Applicant: RICOH COMPANY, LTD., Tokyo (JP)

(72) Inventors: Takumi Satoh, Miyagi (JP); Yuuki Oka, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 784 days.

(21) Appl. No.: 17/076,913

(22) Filed: Oct. 22, 2020

(65) Prior Publication Data

US 2021/0124046 A1    Apr. 29, 2021

(30) Foreign Application Priority Data

Oct. 25, 2019   (JP) ................................. 2019-193895
Oct. 9, 2020    (JP) ................................. 2020-171040

(51) Int. Cl.
   *G01S 7/48*      (2006.01)
   *G01S 17/04*     (2020.01)

(52) U.S. Cl.
   CPC .................................. *G01S 17/04* (2020.01)

(58) Field of Classification Search
   CPC ......... G01N 21/88; G01S 17/04; G01S 17/06; G01S 17/42; G01S 17/88; G01S 17/89; G01S 7/48

USPC ..................................... 250/221, 214 R, 216
See application file for complete search history.

(56) References Cited

U.S. PATENT DOCUMENTS

| | | | |
|---|---|---|---|
| 7,369,223 B2 * | 5/2008 | Hamamatsu | G01N 21/956 356/237.2 |
| 2018/0269651 A1 | 9/2018 | Oka et al. | |
| 2018/0335682 A1 | 11/2018 | Satoh et al. | |
| 2019/0280454 A1 | 9/2019 | Ikeoh et al. | |
| 2020/0150418 A1 | 5/2020 | Satoh et al. | |
| 2020/0160777 A1 | 5/2020 | Ueno et al. | |
| 2020/0178361 A1 | 6/2020 | Oka | |

FOREIGN PATENT DOCUMENTS

| | | |
|---|---|---|
| JP | 2019-060652 | 4/2019 |
| JP | 2019-144065 | 8/2019 |

* cited by examiner

*Primary Examiner* — Que Tan Le
(74) *Attorney, Agent, or Firm* — XSENSUS LLP

(57) ABSTRACT

A detection apparatus includes a light source device, including a plurality of light-emitting elements, configured to irradiate light onto a detection target by dividing an illuminance area into a plurality of illuminance regions; and circuitry configured to switch an illuminance level at each of the plurality of illuminance regions with a plurality of illuminance levels; detect a plurality of detection data of the detection target at the plurality of illuminance regions by switching the illuminance level at each of the plurality of illuminance regions with the plurality of illuminance levels when irradiating the light onto the detection target; and synthesize the plurality of detection data of the detection target.

9 Claims, 22 Drawing Sheets

SQUARE
ARRANGEMENT

SPARSE-DENSE
ARRANGEMENT

ELLIPTICAL
ARRANGEMENT

● : LIGHT-
EMITTING
ELEMENT

FIG. 15

| TIME | ILLUMINANCE REGION | RANGE-FINDING IMAGE | ACQUIRED IMAGE |
|---|---|---|---|
| t=0 | HIGH ILLU-MINANCE (1) / LOW ILLU-MINANCE (1)' | HIGH PRE-CISION (1) / LOW PRE-CISION (1)' | HIGH PRE-CISION (1) / LOW PRE-CISION (1)' |
| t=Δt | LOW ILLU-MINANCE (2) / HIGH ILLU-MINANCE (2)' | LOW PRE-CISION (2) / HIGH PRE-CISION (2)' | SYNTHESIZED HIGH PRECISION (1)+(2) / (1)'+(2)' |
| t=2Δt | HIGH ILLU-MINANCE (3) / LOW ILLU-MINANCE (3)' | HIGH PRE-CISION (3) / LOW PRE-CISION (3)' | SYNTHESIZED HIGH PRECISION (2)+(3) / (2)'+(3)' |
| ... | | | |

FIG. 16

| TIME | ILLUMINANCE REGION | RANGE-FINDING IMAGE | CURRENT AMOUNT PER IMAGE CAPTURING OPERATION |
|---|---|---|---|
| t=0 | HIGH ILLU-MINANCE / LOW ILLU-MINANCE | HIGH-PRE-CISION / LOW PRE-CISION | 2 * 0.5A + 1 * 0.5A = 1.5A |
| t=Δt | LOW ILLU-MINANCE / HIGH ILLU-MINANCE | LOW PRE-CISION / HIGH PRE-CISION | 1 * 0.5A + 2 * 0.5A = 1.5A |
| t=2Δt | HIGH ILLU-MINANCE / LOW ILLU-MINANCE | HIGH-PRE-CISION / LOW PRE-CISION | 2 * 0.5A + 1 * 0.5A = 1.5A |

FIG. 17

| TIME | ILLUMINANCE REGION | RANGE-FINDING IMAGE | CURRENT AMOUNT PER IMAGE CAPTURING OPERATION |
|---|---|---|---|
| t=0 | HIGH ILLUMINANCE | HIGH PRECISION | 2 * A = 2A |
| t=Δt | LOW ILLUMINANCE | LOW PRECISION | 1 * A = A |
| t=2Δt | HIGH ILLUMINANCE | HIGH PRECISION | 2 * A = 2A |

FIG. 19

ILLUMINANCE AREA

MAIN RANGE
FINDING REGION

RANGE FINDING REGION
FOR PERFORMING RANGE
FINDING AS NEEDED

RANGE-FINDING IMAGE.

MAIN RANGE-FINDING TARGET

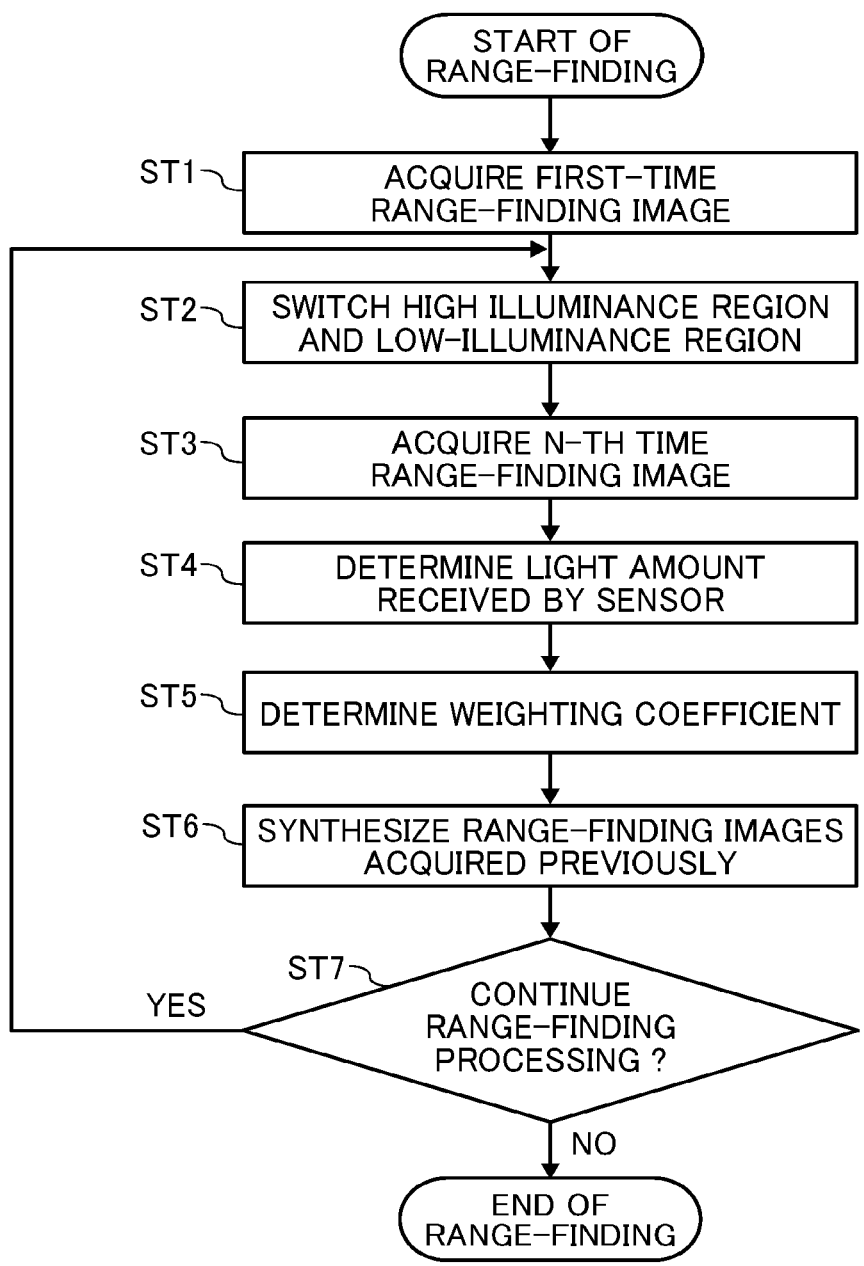

DETECTION APPARATUS AND METHOD OF DETECTING OBJECT COMPRISING A CIRCUITRY TO SWITCH AN ILLUMINANCE LEVEL AT EACH ILLUMINANCE REGION WITH A PLURALITY OF ILLUMINANCE LEVELS

CROSS-REFERENCE TO RELATED APPLICATION

This application claims priority pursuant to 35 U.S.C. § 119(a) to Japanese Patent Applications Nos. 2019-193895, filed on Oct. 25, 2019 and 2020-171040, filed on Oct. 9, 2020 in the Japan Patent Office, the disclosure each of which is incorporated by reference herein in its entirety.

BACKGROUND

Technical Field

This disclosure relates to a detection apparatus, and a method of detecting an object.

Background Art

A technology combining a camera module and a range finding sensor using a time-of-flight (TOF) method is known. Specifically, when a beam emitter emits a beam to a space, the range finding sensor measures a time period defined by the beam emission start time into the space and the beam reception time when the range finding sensor receives the beam reflected from an object, and then the measured time and image information acquired by the camera module are combined to generate three-dimensional position information for generating range or distance information on the object.

The range finding sensor includes a light-emitting unit, a light receiving unit, and a spatial control unit. The light-emitting unit has a plurality of light-emitting elements arranged two-dimensionally, and a light-projection lens system. Each of the light-emitting elements is allocated for each segmented space, set by dividing a space. Each of the light-emitting elements emits light, and the light-projection lens system forms a light beam of each light emitted from each of the light-emitting elements to each segmented space, set by dividing the space. The light receiving unit has a plurality of light-receiving elements arranged two-dimensionally, and a light receiving lens system. Each of the light-receiving elements is allocated for each segmented space, set by dividing the space. Light reflected from each segmented space is focused on each light-receiving element by the light receiving lens system to form an image on each light-receiving element. The spatial control unit independently controls each element group including the light-emitting element and the light-receiving element allocated to the same segmented space.

Sensing modules using the TOF method acquire or obtain three-dimensional depth information, in which a target is illuminated with illumination light, the light reflected from the object is guided to the photoelectric conversion element by the light receiving lens, and then the range or distance information of the target is acquired using the time difference between the time of light projection and the time of light reception or difference in the phase of the optical waveform to obtain or acquire the three-dimensional depth information.

In order to obtain more accurate depth information, the illuminance level of the illumination light on the surface of the target is required to be increased. For example, the illuminance level of the illumination light can be increased by increasing the light output of the illumination light source, by limiting the irradiation range, and by scanning the range finding area using the optical scanning method.

SUMMARY

As one aspect of the present disclosure, a detection apparatus is devised. The detection apparatus includes a light source device, including a plurality of light-emitting elements, configured to irradiate light onto a detection target by dividing an illuminance area into a plurality of illuminance regions; and circuitry configured to switch an illuminance level at each of the plurality of illuminance regions with a plurality of illuminance levels; detect a plurality of detection data of the detection target at the plurality of illuminance regions by switching the illuminance level at each of the plurality of illuminance regions with the plurality of illuminance levels when irradiating the light onto the detection target; and synthesize the plurality of detection data of the detection target.

As another aspect of the present disclosure, a method of detecting an object is devised. The method includes irradiating light onto a detection target using a light source device including a plurality of light-emitting elements by dividing an illuminance area into a plurality of illuminance regions; switching an illuminance level at each of the plurality of illuminance regions with a plurality of illuminance levels; detecting a plurality of detection data of the detection target at the plurality of illuminance regions by switching the illuminance level at each of the plurality of illuminance regions with the plurality of illuminance levels when irradiating the light onto the detection target; and synthesizing the plurality of detection data of the detection target.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 2A and 2B illustrate a standard state of a light source system for a light source device, in which FIG. 2A illustrates a configuration of a light source device, and FIG. 2B illustrates an irradiation state of light on an illuminance plane by the light source device;

FIGS. 3A and 3B illustrate an illuminance area adjustment state of a light-projection optical system for a light source device, in which FIG. 3A illustrates a configuration of the light source device, and FIG. 3B illustrates an irradiation state of light on an illuminance plane by the light source device;

FIG. 15 is a diagram illustrating a first example of integration/synthesis process of a plurality of detection data by a signal control circuit;

FIG. 16 is a conceptual diagram illustrating current amount per image capturing operation when illumination is performed by dividing an illuminance area into a plurality of illuminance regions;

FIG. 17 is a conceptual diagram illustrating current amount per image capturing operation when illumination is performed without dividing an illuminance area into a plurality of illuminance regions;

FIG. 19 is a diagram illustrating a second example of integration/synthesis process of a plurality of detection data by a signal control circuit;

FIG. 22 is an example of a flowchart of range-finding processing by a range finding apparatus according to an embodiment;

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an embodiment with reference to the accompanying drawings.

Figure 1:
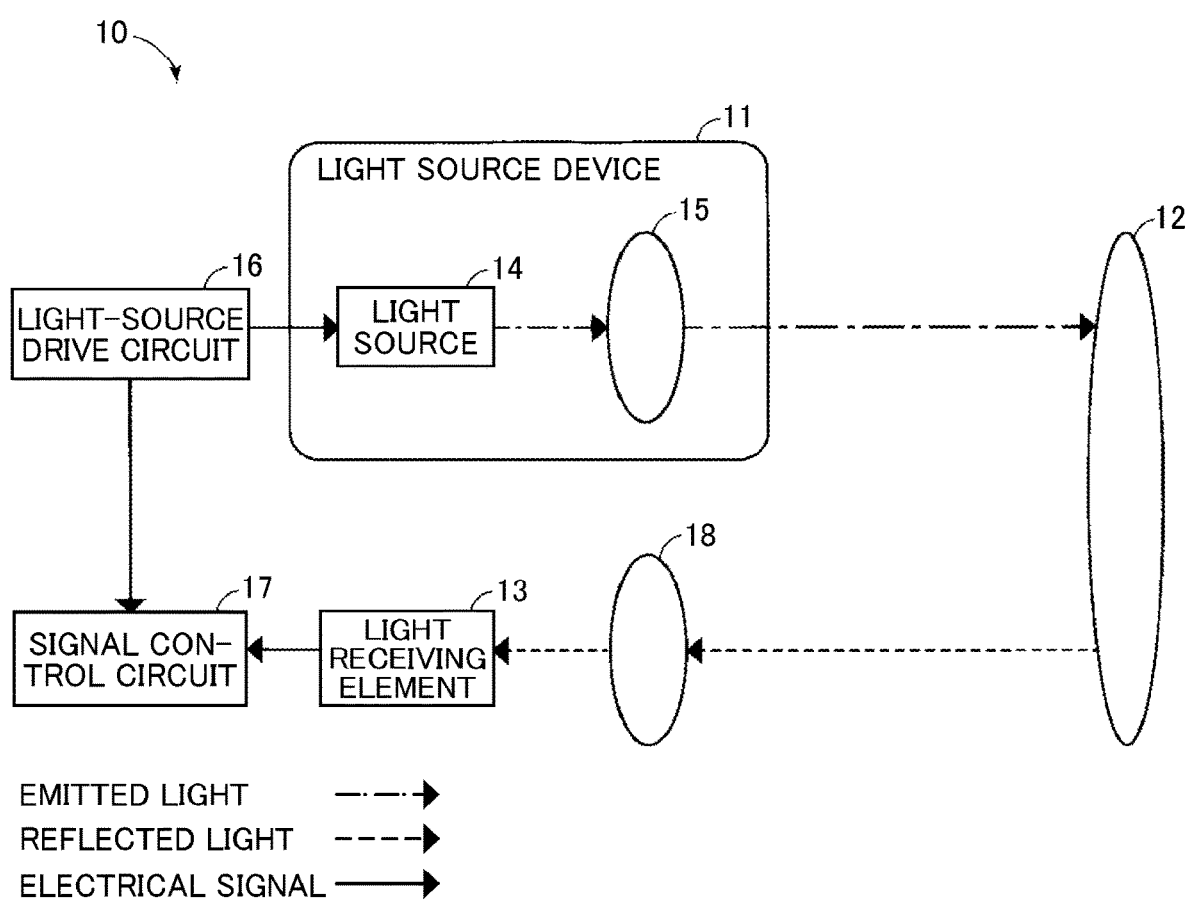
FIG. 1 is a schematic configuration of a range finding apparatus applying a detection apparatus of an embodiment of this disclosure.

FIG. 1 is a schematic configuration of a range finding apparatus 10 applying a detection apparatus of the embodiment. In FIG. 1, the solid line arrow indicates a flow of electrical signals, the dashed arrow indicates a path of reflected light, and the long-short dashed line arrow indicates a path of light beam emitted from the range finding apparatus 10.

The range finding apparatus 10 is a range or distance detection apparatus using a time of flight (TOF) method. The range finding apparatus 10 includes, for example, a light source device 11, a light-receiving element 13, a light-source drive circuit 16, a signal control circuit 17 (control unit), and a light-receiving optical system 18. When the light source device 11 emits or irradiates pulse light to a detection target 12 (target object), the light-receiving element 13 receives the light reflected from the detection target 12, and then the distance or range between the range finding apparatus 10 and the detection target 12 is calculated based on the time difference of the light projection start time and the reflection light reception time.

The light source device 11 includes, for example, a light source 14, and a light-projection optical system 15 (light projection optical unit, refraction optical system).

The light source 14 emits light under the control of the light-source drive circuit 16 (light-source drive unit) by receiving the current from the light-source drive circuit 16.

The light-source drive circuit 16 transmits signals to the signal control circuit 17 (control unit) when the light source 14 emits the light under the control of the light-source drive circuit 16.

The light-projection optical system 15 is an optical system that projects the light emitted from the light source 14 to the detection target 12 by spreading (diverging) the light emitted from the light source 14.

The light projected from the light source device 11 and the reflected from the detection target 12 is guided to the light-receiving element 13 through the light-receiving optical system 18 having the condensing function.

The light-receiving element 13 employs a photoelectric conversion element. The light received by the light-receiving element 13 is photoelectrically converted into electrical signals, and then the electrical signals are transmitted to the signal control circuit 17.

The signal control circuit 17 calculates the range or distance to the detection target 12 based on the time difference between the light projection start time (input of the light emission signal from the light-source drive circuit 16) and the light reception time (input of the light receiving signal from the light-receiving element 13).

Therefore, as to the range finding apparatus 10, the light-receiving element 13 functions as a detection unit that detects the light emitted from the light source device 11 and then reflected from the detection target 12. Further, the signal control circuit 17 functions as a calculation unit for acquiring or obtaining information on the range or distance to the detection target 12 based on the signals received from the light-receiving element 13.

Figure 2A:
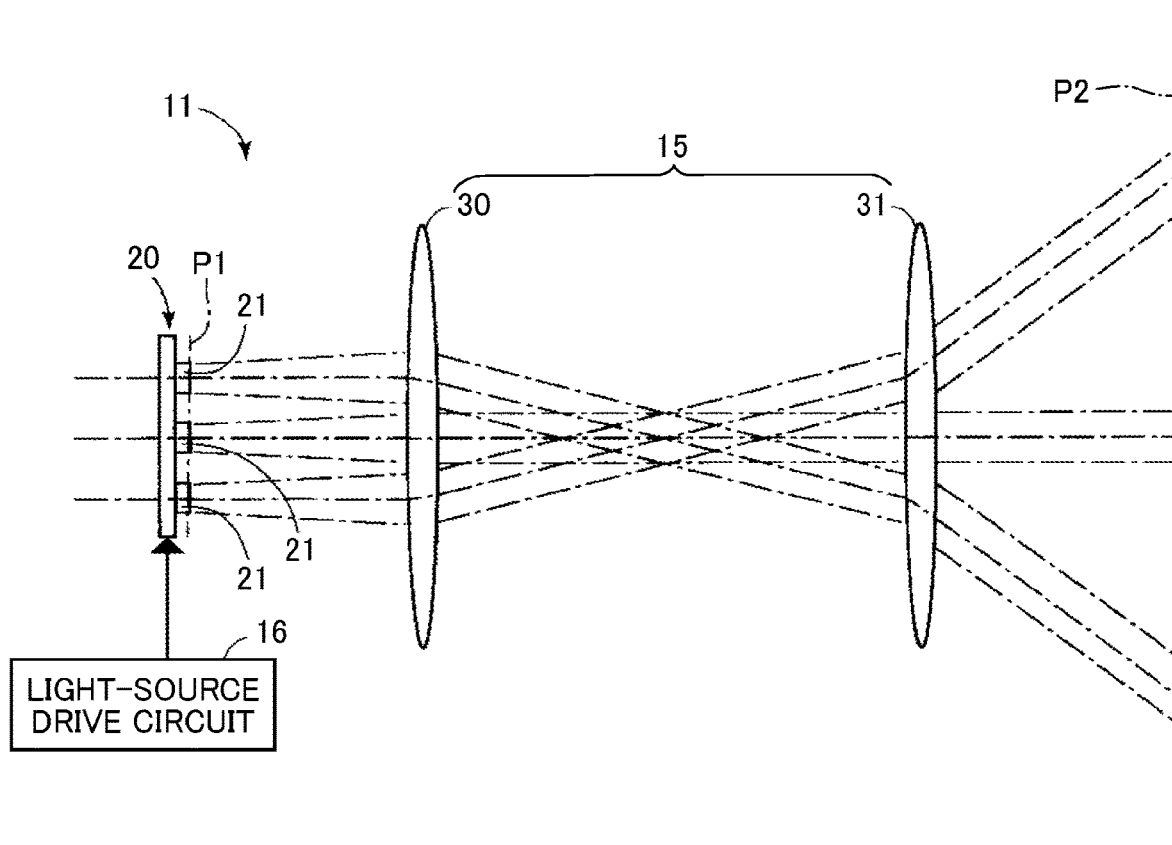
Figure 3A:
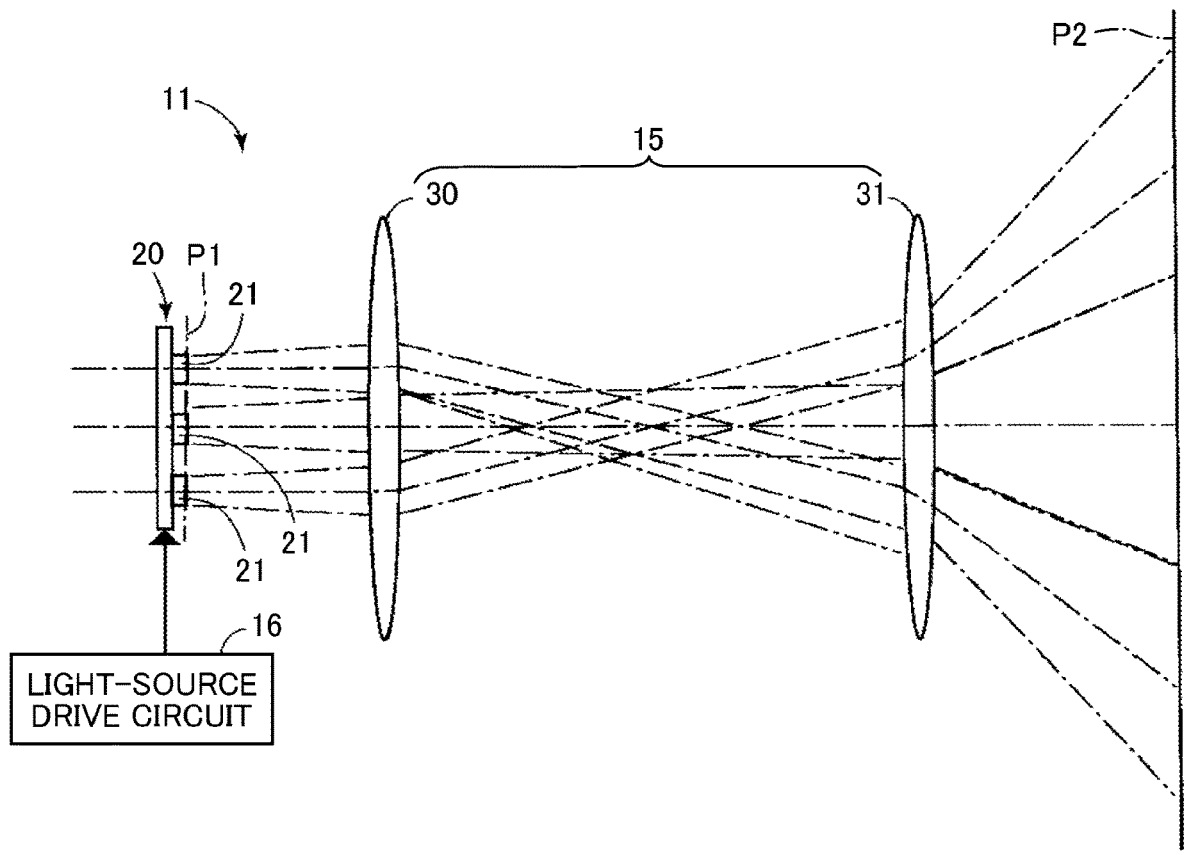

FIG. 2A and FIG. 3A are examples of configuration of the light source device 11. The light source device 11 includes a surface-emitting laser 20 as the light source 14 (FIG. 1) described above. The surface-emitting laser 20 includes a plurality of surface-emitting laser elements 21 (light-emitting elements) arranged on a light-emitting plane P1 with a given positional relationship. As to the embodiment, one example of the light source is the surface-emitting laser 20, and one example of the light-emitting element is the surface-emitting laser element 21. As to the embodiment, the surface-emitting laser element 21 is, for example, a vertical cavity surface emitting laser (VCSEL) that emits light in a direction perpendicular to a substrate, such as a vertical direction.

Figure 4:
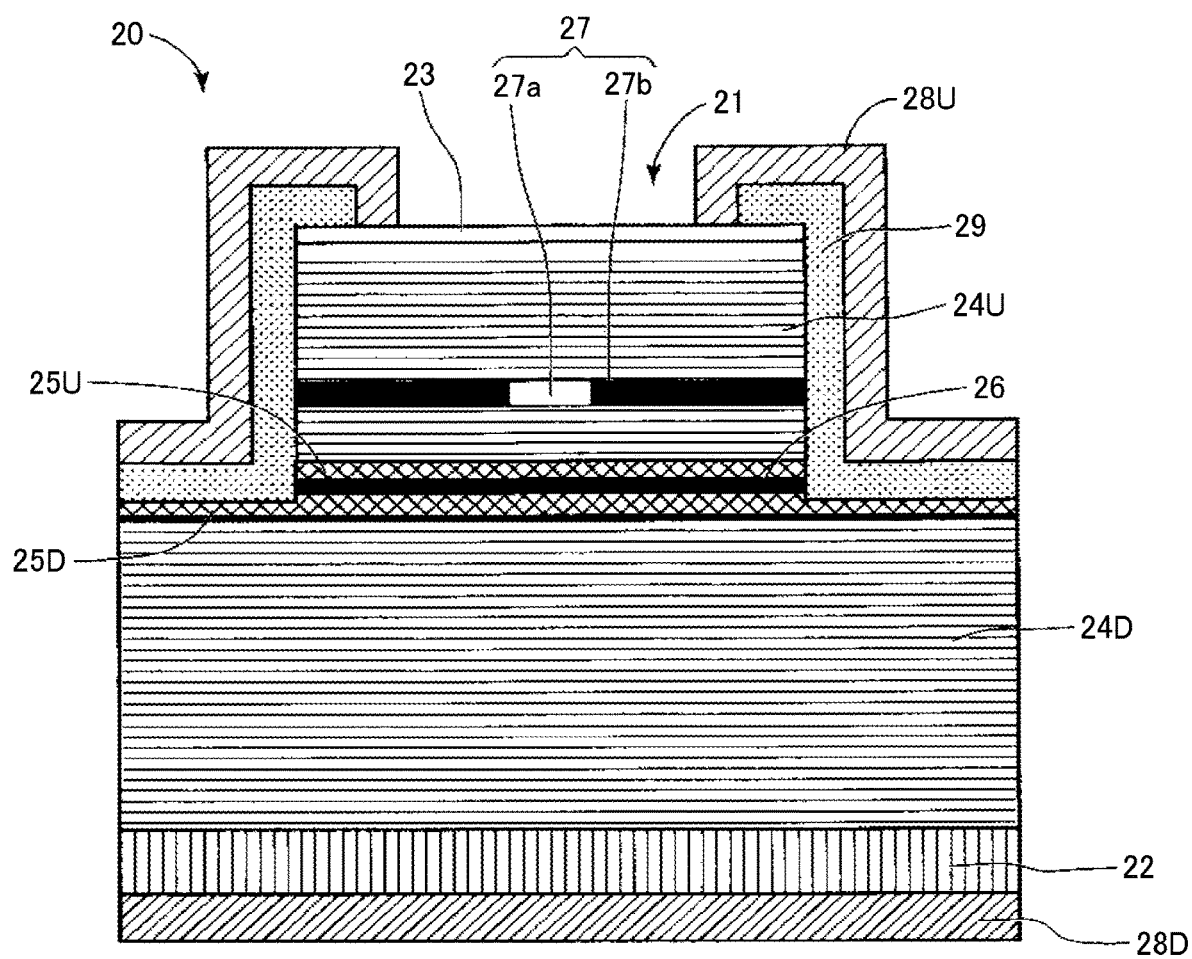
FIG. 4 illustrates a partial cross-sectional view of a structure of light source of a light source device.

FIG. 4 illustrates a partial cross-sectional view of a structure of the surface-emitting laser 20 corresponding to each of the surface-emitting laser element 21. The surface-emitting laser 20 includes, for example, a lower multi-layer reflector 24D, a lower spacer layer 25D, an active layer 26, an upper spacer layer 25U, an upper multi-layer reflector 24U, and a contact layer 23, formed on a substrate 22.

Further, a current constriction layer 27 is formed in the upper multi-layer reflector 24U. The current constriction layer 27 includes a current passing region 27a and a current passing suppressing region 27b surrounding the current passing region 27a.

Further, a lower electrode 28D is arranged on the bottom side of the substrate 22, and a upper electrode 28U is disposed at the uppermost top of the surface-emitting laser 20.

Further, the inner side of the upper electrode 28U is insulated by an insulator 29. Further, the upper electrode 28U contacts a periphery of the contact layer 23, and the center portion of the contact layer 23 is open to the outside environment.

When the current is applied to the active layer 26 from each of the electrodes 28U and 28D, the current is amplified between the upper multi-layer reflector 24U and the lower multi-layer reflector 24D, having the laminated structure, and then the laser light is oscillated. The emission intensity of the laser light beam can be changed in accordance with the magnitude of the applied current.

The current constriction layer 27 increases the efficiency of the applied current to the active layer 26 to lower an oscillation threshold value. As the current passing region 27a of the current constriction layer 27 becomes larger (wider), the applicable maximum current flow rate can be increased, and the maximum output of the laser light beam capable of oscillating increases, but the oscillation threshold value increases.

The VCSEL is characterized in that the two-dimensional arrangement of the light-emitting elements is set easier compared to the end-face emitting laser, and the multi-point beams arranging the light-emitting elements at a higher density can be implemented. Further, the VCSEL has a higher degree of freedom in layout of a plurality of light-emitting elements, and the light-emitting elements can be disposed at any positions on the substrate except the structural constraints, such as arrangement of the electrodes.

As illustrated in FIG. 2A and FIG. 3A, the light-projection optical system 15 includes a condensing lens 30, which is a light-focusing optical element, and a light projection lens 31, which is a light enlarging optical element.

The condensing lens 30 is a lens having a positive power. The condensing lens 30 can suppress the divergence angle of light emitted from the surface-emitting laser element 21 of the surface-emitting laser 20, thereby forming a conjugate image of the surface-emitting laser element 21.

The light-projection lens 31 is a lens having a negative power. The light-projection lens 31 enlarges the irradiation angle of the light passing through the condensing lens 30 to project the light to an illuminance area wider than the light-emitting plane P1 of the surface-emitting laser 20. The curvature of the lens surface of the light-projection lens 31 determines a range of the illuminance area and enlargement of the conjugate image.

FIG. 2A illustrates the light source device 11, in which the focal length of the condensing lens 30 and the distance from the light-emitting plane P1 of the surface-emitting laser 20 to the condensing lens 30 are set equal to each other in the light source device 11. This state is set as a standard state of the light-projection optical system 15 in the light source device 11.

In the standard state of the light-projection optical system 15, the light emitted from the surface-emitting laser element 21 of the surface emitting laser 20 is collimated by the condensing lens 30, and a conjugate image of the surface-emitting laser element 21 is formed at any position on the optical path after the light passing through the condensing lens 30. That is, the light-emitting plane P1 and the illuminance plane P2 are close to each other in a relationship of conjugation. Further, the illuminance plane P2 is a virtual plane that is set to facilitate the understanding of the optical state. The actual detection target 12 is not limited to the plane, but can be various shapes.

Figure 2B:
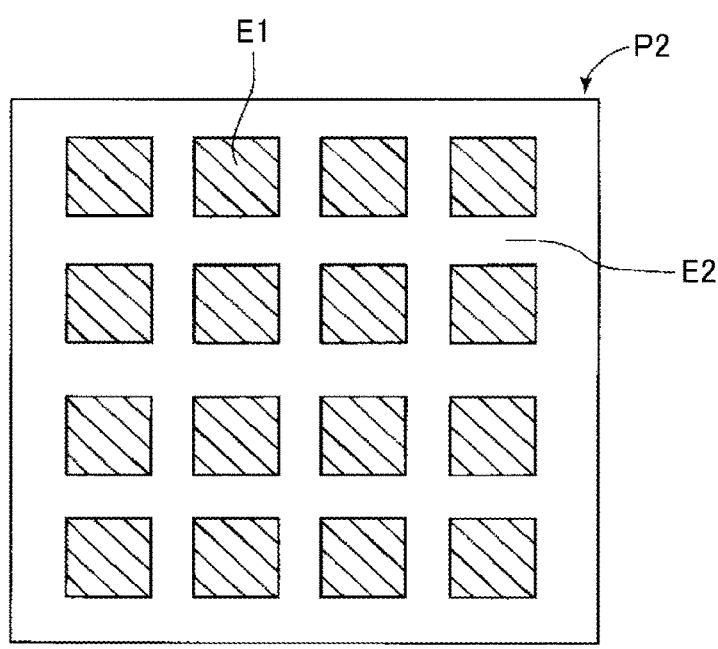

FIG. 2B illustrates the illuminance area on the illuminance plane P2 in the standard state of the light-projection optical system 15. Since there is a gap between the plurality of surface-emitting laser elements 21 in the surface-emitting laser 20, in the standard state where the conjugate image of the surface-emitting laser element 21 is formed, a plurality of discrete illuminance region E1 appears on the illuminance plane P2 with a scattering manner, which means there is a gap between the discrete illuminance regions E1.

More specifically, the discrete illuminance region E is a region where the light is irradiated on the illuminance plane P2. The plurality of discrete illuminance regions E1 is present with a positional relationship corresponding to the arrangement of the plurality of surface-emitting laser elements 21 of the surface-emitting laser 20.

Between each of the discrete illuminance regions E1, there is a non-irradiated region E2 having the illuminance lower than the discrete illuminance region E, which means no light is irradiated on the non-irradiated region E2. The non-irradiated region E2 is a region corresponding to a gap portion between the plurality of surface-emitting laser elements 21 in the surface-emitting laser 20. In other words, in the standard state of the light-projection optical system 15, the illuminance level of the illuminance plane P2 becomes intense with a scattering manner, and thereby uniformity of illuminance level cannot be obtained.

FIG. 3A illustrates a state in which the condensing lens 30 is shifted toward a side (closer to the light-emitting plane P1) slightly along the optical axis direction from the standard state (FIG. 2A) of the light-projection optical system 15. This state is set as an illuminance area adjustment state of the light-projection optical system 15 in the light source device 11.

Figure 3B:
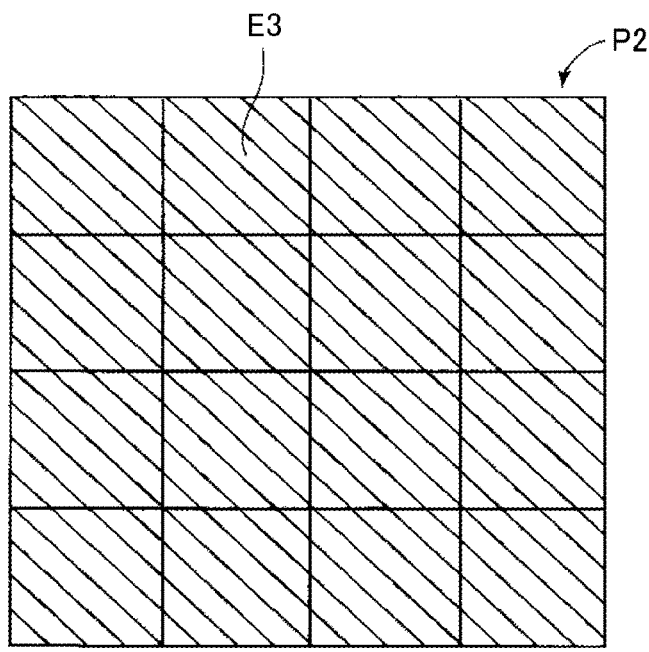

In the illuminance area adjustment state, by shifting the condensing lens 30, the light emitted from the surface-emitting laser element 21 does not completely collimate but diverges so that the image of the surface-emitting laser element 21 becomes wider than that of the above-described standard state. As a result, as illustrated in FIG. 3B, the light is irradiated on the illuminance plane P2 by filling the gap between the plurality of surface-emitting laser elements 21 on the illuminance plane P2 to obtain an entire illuminance area E3.

The illuminance area adjustment state can be set from the standard state by shifting the condensing lens 30 with conditions that vary depending on the specifications and various conditions of the light-projection optical system 15 and the surface emitting laser 20.

In the configuration of the embodiment, by shifting the condensing lens 30 toward the light-emitting plane P1 (closer to the light-emitting plane P1) with a range of 15% to 24% of the distance between the light-emitting plane P1 of the surface emitting laser 20 and the condensing lens 30 in the standard state (i.e., corresponding to the focal length of the condensing lens 30), the entire illuminance area E3 having a wider angle and uniform illuminance level can be obtained.

If the shifting amount of the condensing lens 30 is less than the lower limit of the range such as "15%," the illuminance area on the illuminance plane P2 corresponding to the surface-emitting laser element 21 becomes narrower, and the non-illuminance region E2 illustrated in FIG. 2B appears on the illuminance plane 2.

Further, if the shifting amount of the condensing lens 30 exceeds the upper limit of the range such as "24%," the incident angle of the light to the light-projection lens 31 becomes too large, in which the influence of aberration on the illuminance area on the illuminance plane P2 becomes larger, with which the uniformity of illuminance level may be impaired.

Other than the above described method of shifting the optical axis position of the condensing lens 30 in the light-projection optical system 15, the light irradiation not causing the non-illuminance region E2 can be implemented by changing the curvature of the lens surface of the light projection lens 31.

More specifically, in this method, the conjugate image of the surface-emitting laser element 21 is incident on the light-projection lens 31, and the image of each of the surface-emitting laser elements 21 is enlarged by setting a given curvature on the light projection lens 31. Then, the light projection lens 31 that can obtain the appropriate irradiation range not causing the non-illuminance region E2 (i.e., causing the entire illuminance area E3) is selected. This method performs an operation of changing the light-projection lens 31 alone in accordance with the intended irradiation range without changing the combination and arrangement of the surface-emitting laser 20 and the condensing lens 30, thereby reducing the workload on setting and adjusting.

As described above, the illuminance plane P2 is an area on which the images of the plurality of surface-emitting laser elements (light-emitting elements) 21 are irradiated with a given size. If the current amount applied to the surface-emitting laser element 21 is increased, the illuminance level on the illuminance region (e.g., entire illuminance area E3) corresponding to each of the surface-emitting laser elements 21 is also increased.

Further, if the illuminance regions corresponding to the plurality of surface-emitting laser elements 21 are overlapped, the illuminance level of the illuminance region (e.g., entire illuminance area E3) corresponding to the each of the surface-emitting laser elements 21 can be adjusted by adjusting the number of the surface-emitting laser elements 21 (e.g., by changing the emission ratio of the surface-emitting laser elements 21 that overlap the illuminance regions).

As to the adjustment of the illuminance area by the light-projection optical system 15, a method of shifting the optical axis position of the condensing lens 30, and a method of changing the curvature of the lens surface of the light-projection lens 31 (replacing the light-projection lens 31) can be used collectively.

In the range finding apparatus 10 of FIG. 1, the configuration and arrangement of the light-receiving element 13 (FIG. 1) are corresponded to the illuminance region (area) of the light projected from the light source device 11. With this configuration, the corresponding relationship between the light emitted from the surface-emitting laser element 21 of the surface-emitting laser 20 and the light reflected from the detection target 12 and received by the light-receiving element 13 can be maintained, with which an accurate detection (i.e., rang finding) can be performed for each illuminance region corresponding to each of the surface-emitting laser elements 21.

The configuration of the light-projection optical system according to the embodiment is not limited to examples illustrated in FIGS. 2A and 3A.

For example, the light-focusing optical element configuring the light-projection optical system 15 can be any element that can reduce the divergence angle of the light emitted from the light source (surface-emitting laser 20), in which a diffraction grating or the like can be used instead of the lens.

Further, if a lens is used as the light-focusing optical element, the lens may be a shared lens capable of passing through the light emitted from the plurality of surface-emitting laser elements 21, or may be a micro-lens array having a plurality of lenses corresponding to each of the surface-emitting laser elements 21.

The light-projection optical element in the light-projection optical system 15 can be any optical element that can enlarge the light-projection area, in which biconcave lens, negative meniscus lens, or diffusion plate can be used.

In a case where a lens is used as the light-focusing optical element and a lens is used as the light-projection optical element, the number of lenses arranged in the direction of the optical axis may be a single (single lens), or a lens group consisting of a plurality of lenses.

Figure 5A:
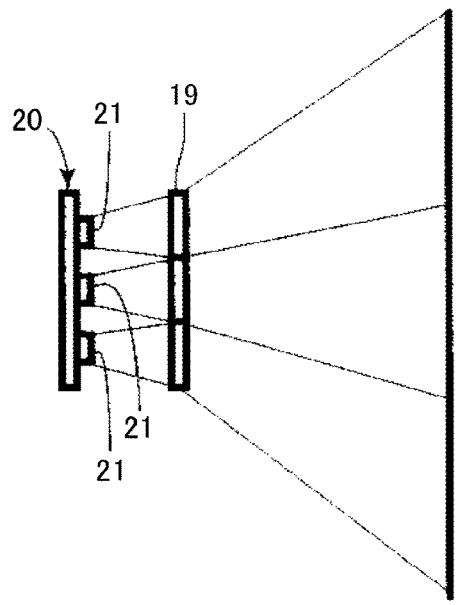
FIGS. 5A and 5B are diagrams illustrating an example case using diffractive optical element as a light-projection optical unit.
Figure 5B:
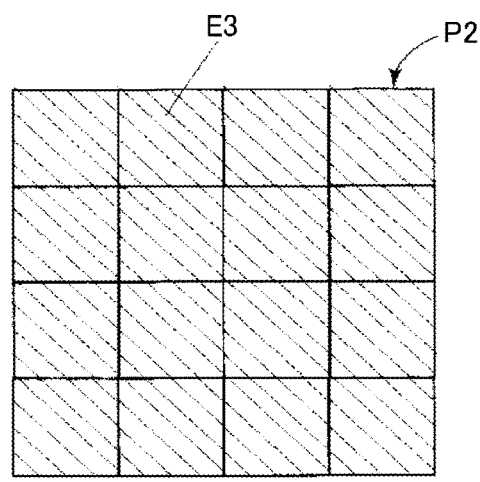

FIGS. 5A and 5B are diagrams illustrating an example case using a diffractive optical element 19 as the light-projection optical unit (light-projection optical element).

In FIGS. 2 and 3, the light-projection optical system (refraction optical system) that forms the conjugate image of the surface-emitting laser element 21 on the illuminance region as the light-projection optical unit (light-projection optical element) is described, but is not limited thereto.

For example, as illustrated in FIGS. 5A and 5B, the diffraction optical element 19 that projects the light emitted from the surface-emitting laser element 21 using a diffraction grating can be used as the light-projection optical system. The diffraction grating is an optical element having a fine structure formed on a surface of quartz glass or the like, and the diffraction grating has an effect of deflecting the output light into a specific direction in accordance with the structure and the wavelength of light of the incident beam.

FIGS. 5A and 5B illustrate an example of optical system, in which the light emitted from each the surface-emitting laser elements 21 of the VCSEL is incident onto the diffractive optical element 19, and the illuminance area is irradiated without a gap between the illuminance regions. In this example configuration, the number of the diffractive optical elements 19 (diffraction grating) is set same as the number of the surface-emitting laser elements 21. Each of the diffractive optical element 19 has the fine structure that controls the deflecting direction and the diverging angle of the exit light pattern to irradiate the entire illuminance area (e.g., E3) without causing a gap between the discrete illuminance regions. With employing this optical system, when the output of each of the surface-emitting laser elements 21 of the VCSEL increases, the illuminance level of the corresponding illuminance region increases accordingly.

In FIGS. 5A and 5B, the diffractive optical element 19 of transmissive type is used, but the diffractive optical element 19 of reflection-type may be used. Further, in place of the diffractive optical element 19 of transmissive type or the diffractive optical element 19 of reflection-type, a diffusion plate controlling the diffusion characteristic may be arranged at the rear stage of the VCSEL to perform the area-dividing illumination. In this case, the diffusion plate of transmissive or reflective type may be used.

As described above, the light source device 11 can include the refraction optical system, diffractive optical element, or diffusion plate as the light-projection optical system that projects the light emitted from the plurality of surface-emitting laser elements 21 (light-emitting elements) toward the detection target 12 (target object, to-be-detected object).

Figure 6A:
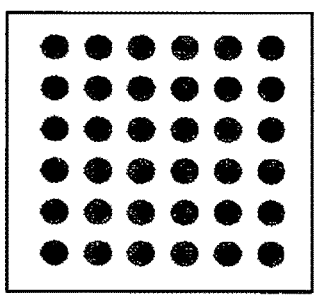
FIGS. 6A, 6B and 6C illustrate examples of arrangement patterns of a plurality of light-emitting elements of a light source.
Figure 6B:
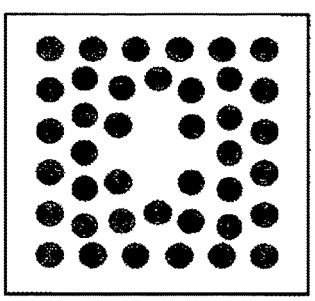
Figure 6C:
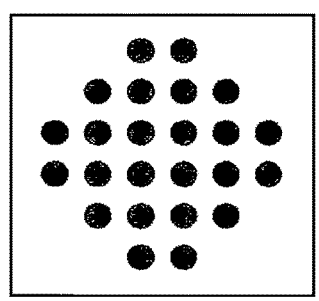

FIGS. 6A, 6B, and 6C illustrate examples of arrangement patterns of a plurality of light-emitting elements of the light source, which is a planar arrangement of the surface-emitting laser element 21 of the VCSEL.

FIG. 6A illustrates a square arrangement pattern of the surface-emitting laser element 21 (light-emitting element), which is arranged with at equal intervals.

FIG. 6B illustrates a sparse-dense arrangement pattern of the surface-emitting laser element 21 (light-emitting element), which is arranged with wider intervals at the center portions of the surface-emitting laser element 21 and with narrower intervals at a peripheral portion of the surface-emitting laser element 21.

FIG. 6C illustrates an elliptical arrangement pattern of the surface-emitting laser element 21 (light-emitting element), which is arranged in an ellipse pattern as a whole.

The planar arrangement of each of the surface-emitting laser elements 21 of the VCSEL is not limited to those illustrated in FIGS. 6A, 6B, and 6C, but various design modifications can be made.

In the embodiment, the surface-emitting laser 20 (light source) irradiates the light emitted from the plurality of surface-emitting laser elements 21 (light-emitting elements) toward the detection target 12 (target object). That is, the light source device 14 includes a plurality of light-emitting elements (i.e., emission points), and each of the emission light forms a conjugate image on the illuminance area by the light-projection optical system 15.

This means that the illuminance area is divided and irradiated in accordance with the number of emission points. Thus, the light source device 11 divides the illuminance area of the light illuminated by the plurality of surface-emitting laser elements 21 on the detection target 12 into a plurality of illuminance regions in accordance with the number of the plurality of surface-emitting laser elements 21.

Further, the light-source drive circuit 16 (light source drive unit) switches a plurality of illuminance levels for each of the plurality of illuminance regions, which is a discrete illuminance region set by dividing the illuminance area and irradiated by the light source device 11. In the embodiment, the light-source drive circuit 16 adjusts the plurality of illuminance levels by adjusting the current amount applied to each of the plurality of surface-emitting laser elements 21.

In the embodiment, a description is given of a case where the light source drive circuit 16 switches a high illuminance level and a low illuminance level with respect to each of the plurality of illuminance regions to set a high illuminance region and a low illuminance region. That is, the light-source drive circuit 16 adjusts or switches the current amount applied to each of the plurality of surface emitting laser elements 21 sequentially (e.g., at pre-set time interval) to perform the irradiation of the high illuminance region and the low illuminance region separately.

Further, in the embodiment, the light-source drive circuit 16 may switch the high luminance level, the medium illuminance level, and the low illuminance level to set the high luminance region, the medium illuminance region, and the low illuminance region for each of the plurality of illuminance regions. Further, in the embodiment, the light-source drive circuit 16 may switch the illuminance level at four or more levels to set the illuminance regions of four or more states for each of the plurality of illuminance regions. As described above, the light-source drive circuit 16 switch at least the high illuminance level and the low illuminance level to set the high illuminance region and the low illuminance region for each of the plurality of illuminance regions (it is sufficient if the illuminance level and the illuminance region are set at least two).

In the embodiment, the illuminance level can be set with a concept including zero (no irradiation). For example, in a case where the high illuminance level, the medium illuminance level, and the low illuminance level are switched to set the high illuminance region, the medium illuminance region, and the low illuminance region, the low illuminance level and the low illuminance region can be set zero (i.e., no irradiation).

Figure 7:
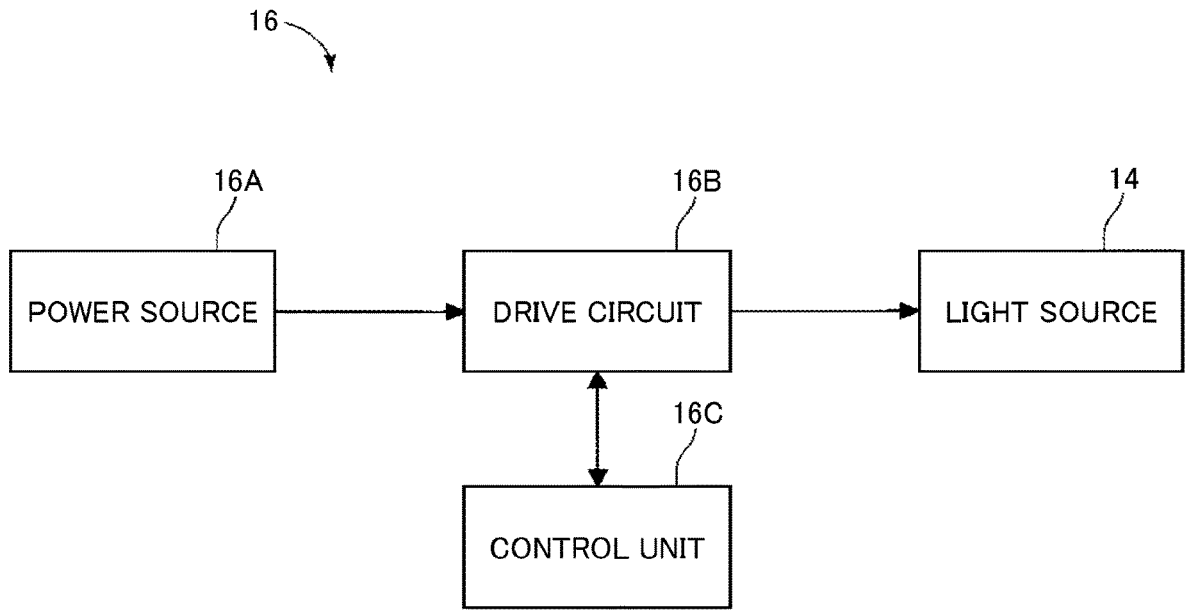
FIG. 7 is an example of configuration of functional block diagram of a light-source drive circuit.

FIG. 7 is an example of configuration of functional block diagram of the light-source drive circuit 16. The light-source drive circuit 16 includes, for example, a power source 16A, a drive circuit 16B, a control unit 16C, and a light source 14. Further, in FIG. 1, the light source 14 is described as a component of the light source device 11 and is not drawn as a component of the light-source drive circuit 16, but this is due to the convenience of drawing. The light source 14 may be a component of the light source device 11 or a component of the light-source drive circuit 16. If the light source 14 is the component of the light-source drive circuit 16, the delay of the signal processing can be prevented, which is preferable.

The power source 16A is a constant voltage source to which the direct current (DC) voltage is supplied.

The drive circuit 16B changes the voltage and the current supplied to the power source 16A by performing boost control or step-down control (buck control) of the voltage supplied from the power source 16A to output the current corresponding to the light emission timing.

The control unit 16C controls the voltage value, the current value, and the light emission timing by the drive circuit 16B. The control unit 16C is implemented by large-scale integration (LSI) chip including TOF sensor, an integrated circuit chip such as microprocessor, a logic device, such as field programmable gate array (FPGA), a combination of integrated circuit chip and logic device. The control unit 16C controls the light emission timing in line with the exposure timing of TOF sensor.

The power source 16A, the drive circuit 16B and the control unit 16C supply the current corresponding to the illuminance level and light emission timing to the light source 14 (the surface emitting laser element 21 of the surface-emitting laser 20). That is, the current applied to the light source 14 (the surface-emitting laser element 21 of the surface-emitting laser 20) is adjusted or switched.

Figure 8:
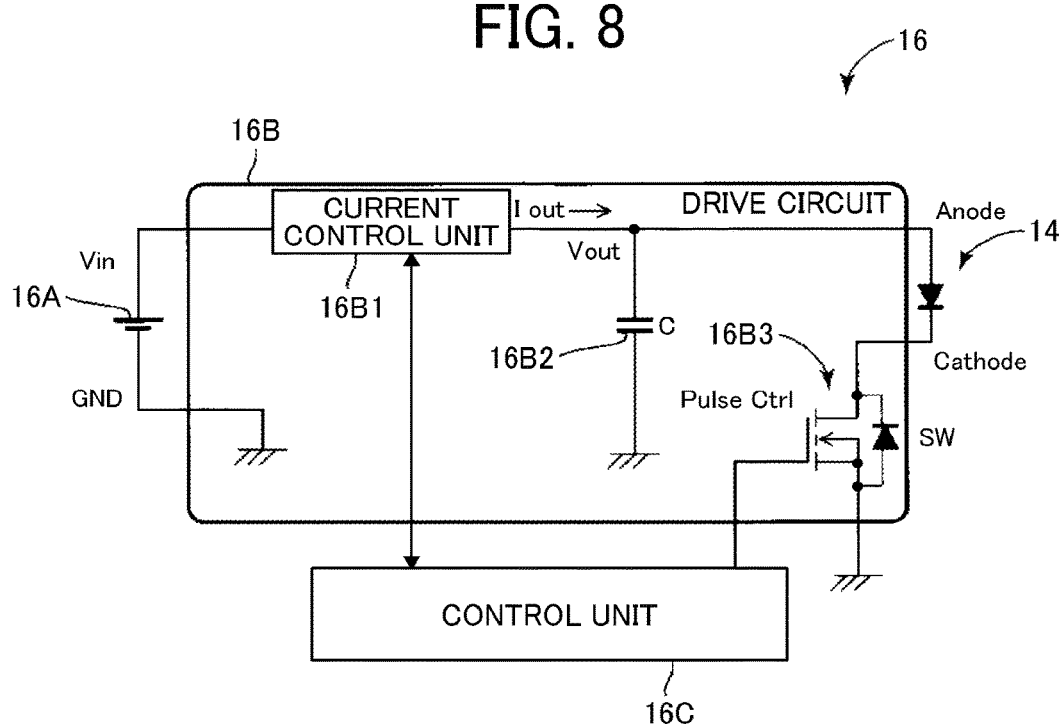
FIG. 8 is a diagram illustrating a first example of circuit configuration of a light-source drive circuit.

FIG. 8 is a diagram illustrating a first example of circuit configuration of the light-source drive circuit 16. The drive circuit 16B includes a current control unit 16B1, a capacitor 16B2, and a switch 16B3. The current control unit 16B1 includes at least one of an output voltage detection unit and an output current detection unit, and uses a direct current to direct current (DC-DC) converter of switching control method capable of performing at least one of the boost control and step-down control.

The power source 16A, grounded on the ground (GND), supplies the voltage Vin. The current control unit 16B1 perform the boost control or step-down control on the voltage "Vin" supplied from the power source 16A to control the voltage output "Vout" and the current output "Iout" set by the control unit 16C.

The capacitor 16B2 can be, for example, low equivalent series inductance (ESL) laminated ceramic capacitor, electrolytic capacitor, or a combination thereof.

The switch 16B3 can employ a semiconductor switch, such as metal oxide semiconductor field effect transistor (MOSFET) and gallium nitride field effect transistor (GaN-FET). The configuration of the switch 16B3 is selected in accordance with the driving frequency and the current value of the light source 14. For example, the MOSFET can be used as the switch 16B3 for the driving frequency of several kHz to several tens of MHz, and the GaNFET can be used as the switch 16B3 for the driving frequency of several tens of MHz to several hundreds of MHz. If the current value is several amperes or more even at several tens of MHz, the GaNFET may be used to speed up the start-up time.

The switch 16B3 is controlled ON-OFF (Pulse Ctrl) by the control unit 16C, with which the light-emitting timing and the current amount applied to the light source 14 (the surface-emitting laser element 21 of the face emitting laser 20) are controlled. Further, a gate drive circuit is set between the control unit 16C and the switch 16B3 (gate of field-effect transistor (FET)), which is omitted from the illustration.

Figure 9:
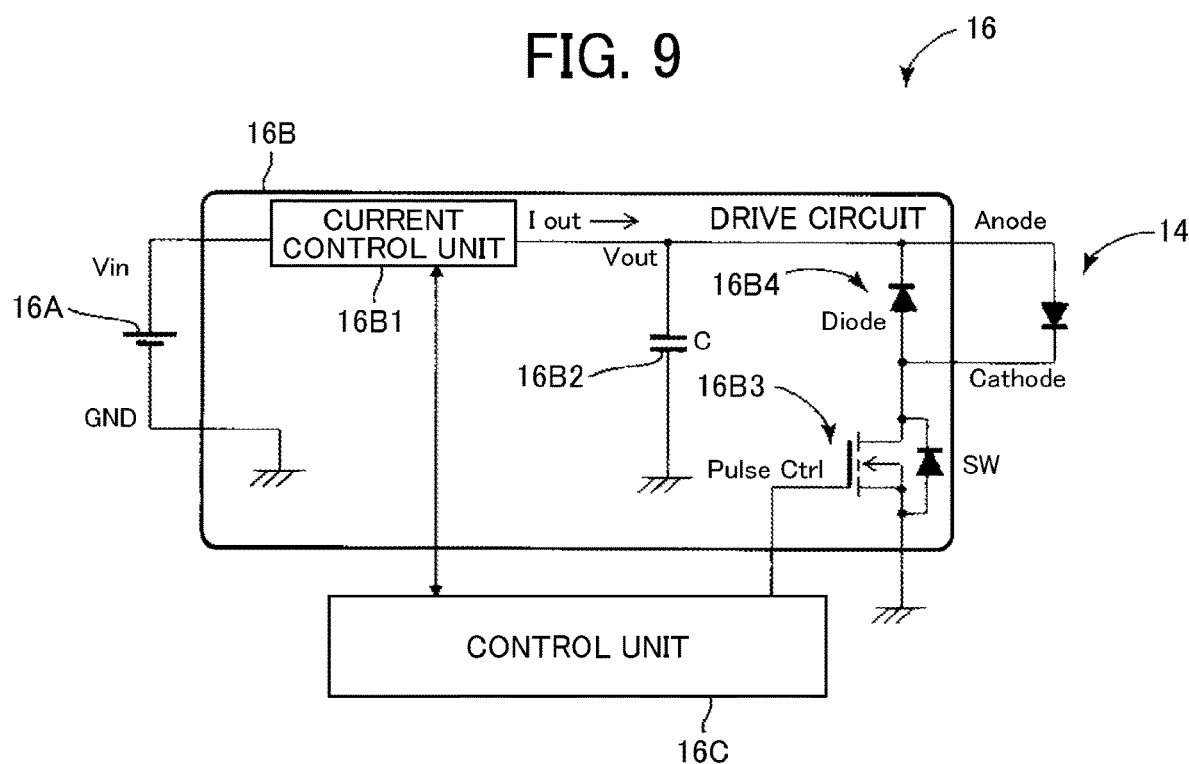
FIG. 9 is a diagram illustrating a second example of circuit configuration of a light-source drive circuit.

FIG. 9 is a diagram illustrating a second example of circuit configuration of the light-source drive circuit 16. The same reference numerals are given in the same position as in FIG. 8 (first example), and the duplicate description is omitted.

In FIG. 9, a diode 16B4, arranged (connected) in parallel to the light source 14, is added between the current control unit 16B1 and the capacitor 16B2, and the switch 16B3. With this configuration, the switching characteristic of the switch 16B3 (e.g., state transition between ON-state and OFF-state of the illumination) can be improved.

Figure 10:
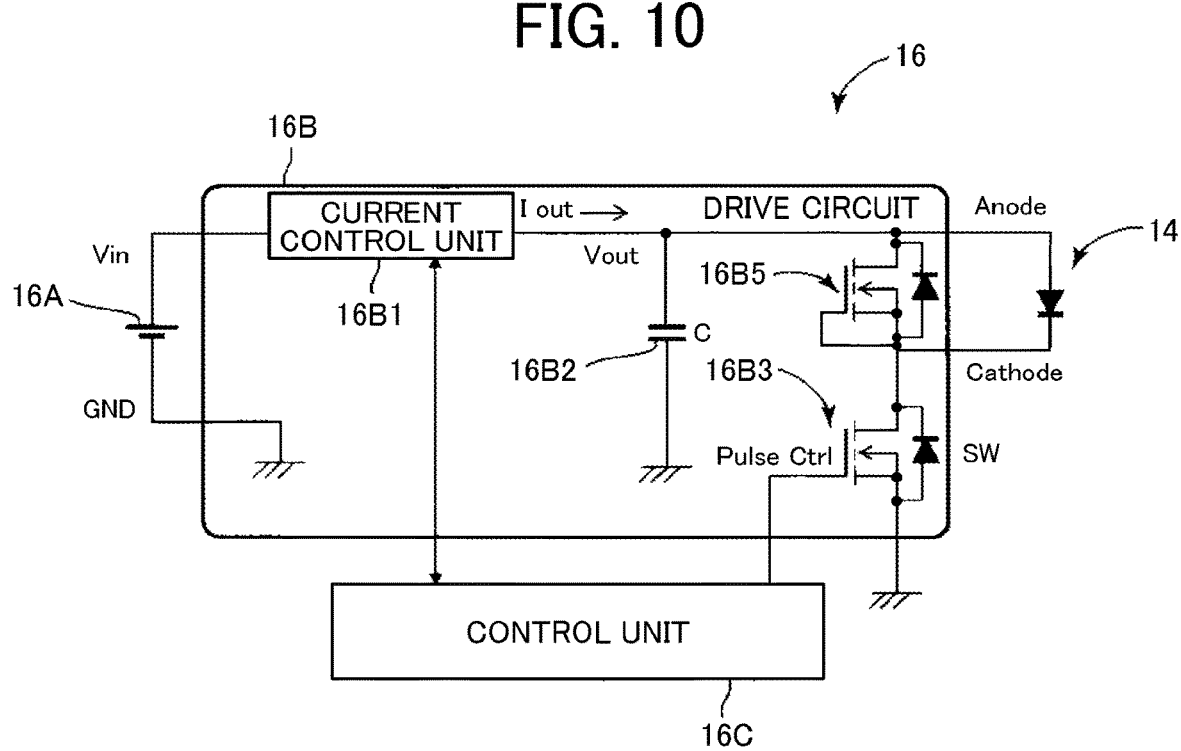
FIG. 10 is a diagram illustrating a third example of circuit configuration of a light-source drive circuit.

FIG. 10 is a diagram illustrating a third example of circuit configuration of the light-source drive circuit 16. The same reference numerals are given in the same position as in FIG. 8 (first example), and the duplicate description is omitted.

In FIG. 10, a GaNFET 16B5, arranged (connected) in parallel with the light source 14, is added between the current control unit 16B1 and the capacitor 16B2, and the switch 16B3. The GaNFET 16B5 functions as a diode by short-circuiting between the gate and the source of the GaNFET 16B5. The GaNFET 16B5 having the function similar to the diode 16B4 of FIG. 9 (second example) can further improve the switching characteristics of the switch 16B3 (e.g., state transition between ON-state and OFF-state of the illumination).

Figure 11:
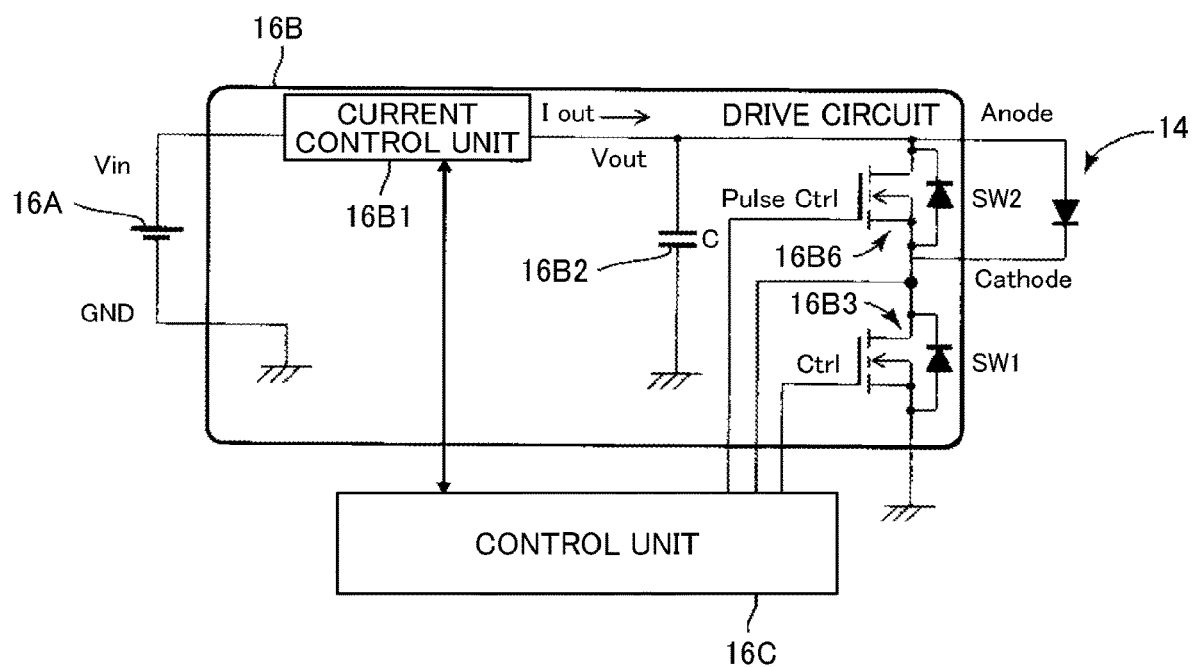
FIG. 11 is a diagram illustrating a fourth example of circuit configuration of a light-source drive circuit.

FIG. 11 is a diagram illustrating a fourth example of circuit configuration of the light-source drive circuit 16. The same reference numerals are given in the same position as in FIG. 8 (first example), and the duplicate description is omitted.

In FIG. 11, a switch 16B6, arranged (connected) in parallel with the light source 14, is added between the current control unit 16B1 and the capacitor 16B2, and the switch 16B3.

The switch 16B3 functions as "first switch SW1" arranged (connected) in series with the light source 14, and the switch 16B6 functions as "second switch SW2" arranged (connected) in parallel to the light source 14. The control unit 16C acquires an intermediate potential voltage for driving the switch 16B6 (second switch SW2), and controls the switch 16B6 (second switch SW2) using the intermediate potential voltage as a reference.

By controlling the ON-OFF state of the switch 16B6 (second switch SW2) while the switch 16B3 (first switch SW1) is being supplied with the current, the current is supplied to the light source 14 or the switch 16B6 (second switch SW2). With this configuration, the light source 14 is subjected to ON/OFF control. With this configuration, the current control unit 16B1 can constantly supply the desired current, with which the ON-OFF control of the light source 14 can be performed irrespective of the response speed of the current control unit 16B1 (not affected by the response speed).

Figure 12:
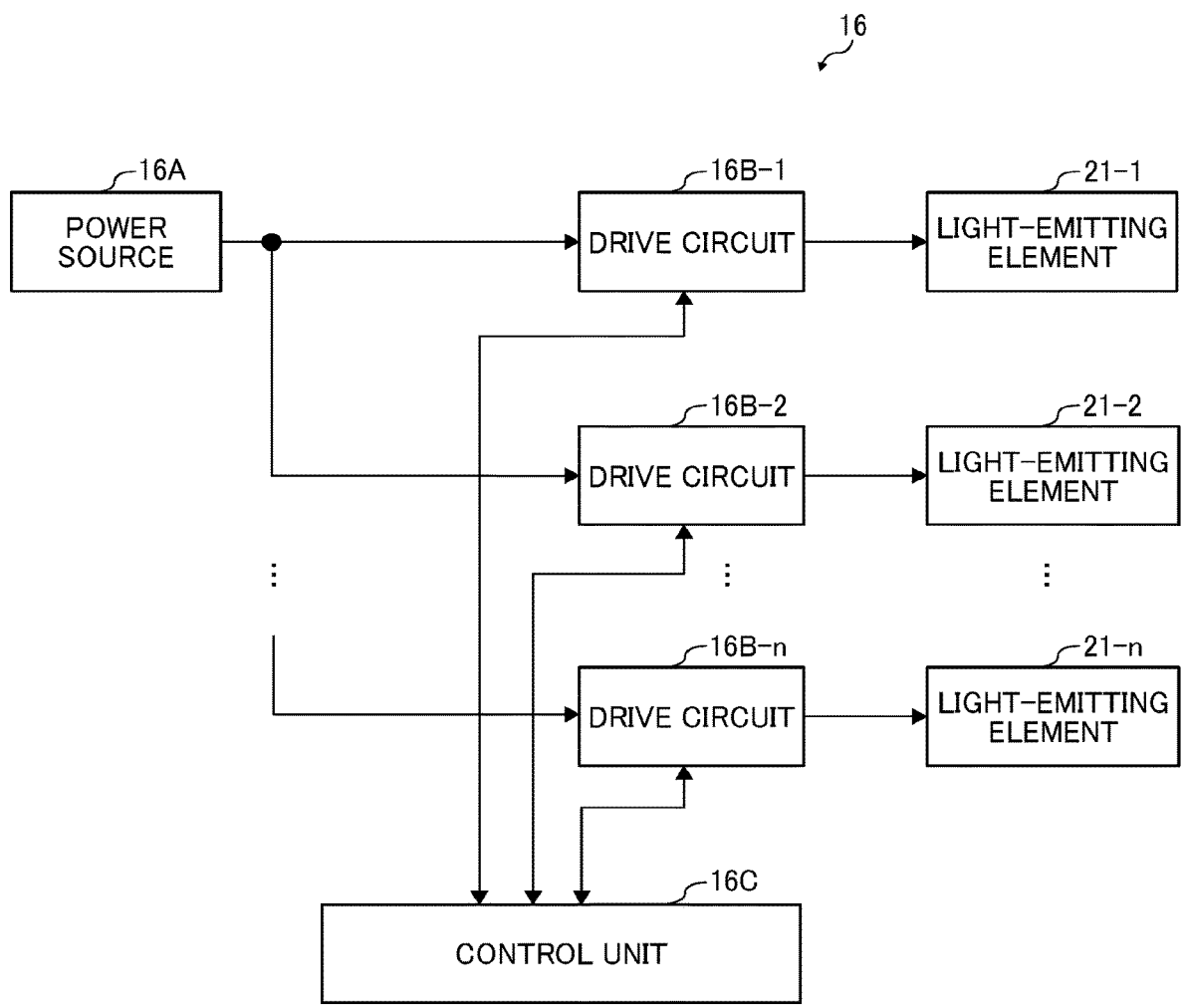
FIG. 12 is an example of circuit configuration of a light-source drive circuit corresponding to a plurality of illuminance regions.

FIG. 12 is an example of circuit configuration of the light-source drive circuit 16 corresponding to a plurality of illuminance regions. FIG. 12 illustrates an example circuit configuration of the light-source drive circuit 16 corresponding to "n" illuminance regions when the illuminance area is divided into "n" regions ("n" is a positive integer). To divide the illuminance area into "n" regions, the surface emitting laser 20 (light source) has "n" surface-emitting laser elements 21-1 to 21-n (light-emitting elements).

Further, in order to drive and control the "n" surface-emitting laser elements 21-1 to 21-n independently, the drive circuit 16 includes "n" drive circuits 16B-1 to 16B-n, in which "n" illuminance regions, "n" surface-emitting laser elements 21-1 to 21-n, and "n" drive circuits 16B-1 to 16B-n are respectively corresponded with each other.

Further, the light-source drive circuit 16 includes a single power source, such as the power source 16A, and a single control unit, such as the control unit 16C, corresponding to the "n" drive circuits 16B-1 to 16B-n. The "n" drive circuits 16B-1 to 16B-n can be independently controlled by the control unit 16C. For example, the "n" drive circuits 16B-1 to 16B-n may employ the configuration of the drive circuit 16B illustrated in FIGS. 7 to 11.

Further, the power source 16A and the control unit 16C are not limited to a single unit, but the power source 16A and the control unit 16C may be provided with a plurality of numbers, such as the power source 16A and the control unit 16C may be provided with a plurality of number of "n" corresponding to the "n" drive circuits 16B-1 to 16B-n.

Figure 13:
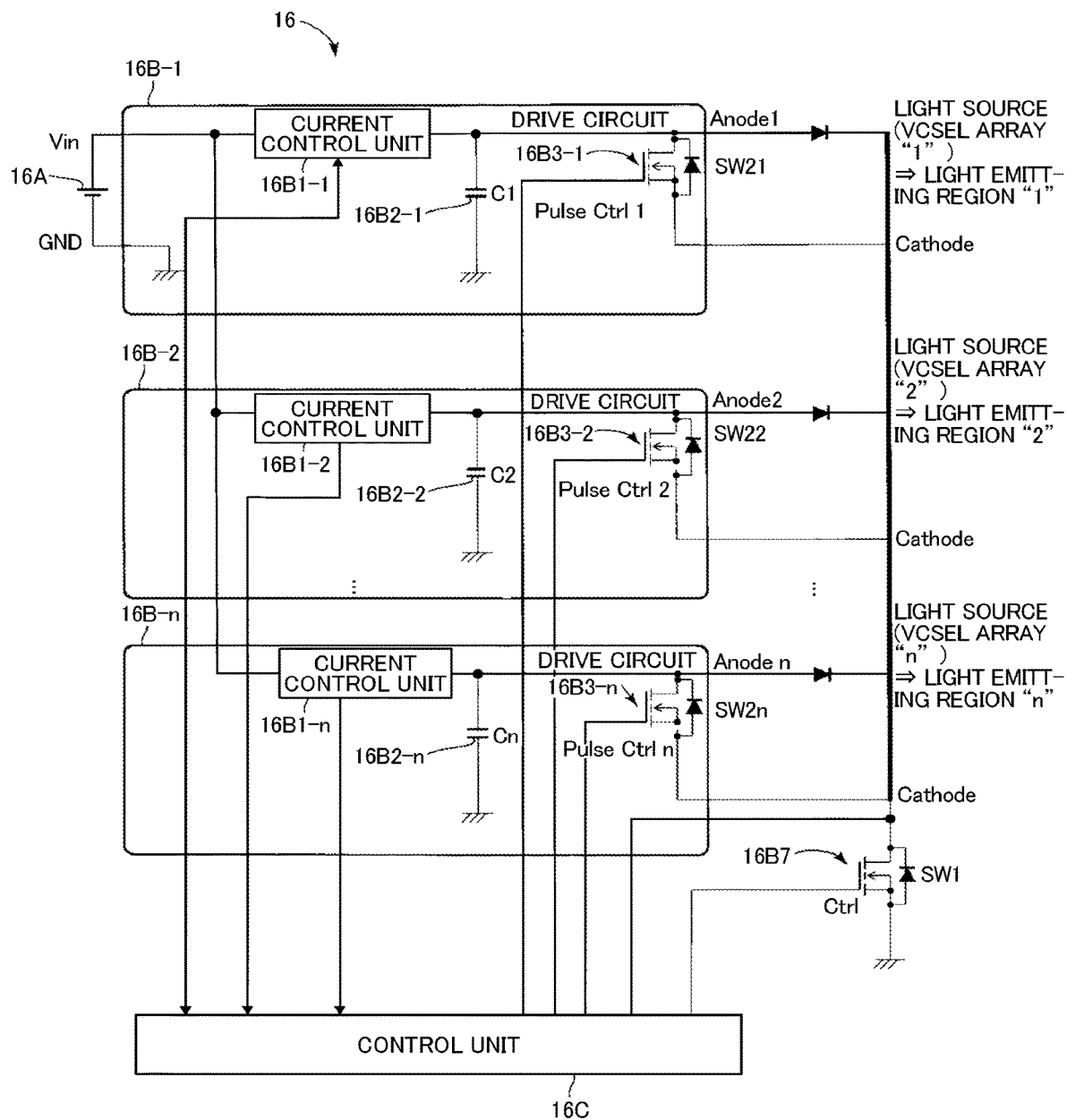
FIG. 13 is a diagram illustrating a fifth example of circuit configuration of a light-source drive circuit.

FIG. 13 is a diagram illustrating a fifth example of circuit configuration of the light-source drive circuit 16. The drive circuit 16B illustrated in FIGS. 7 to 12 can be adapted when the anode and cathode are separated. FIG. 13 corresponds to a case where the cathode of the drive circuit 16B is not separated. Hereinafter, a description is given of an example case of the detailed structure of the light-source drive circuit for driving a plurality of light sources (light-emitting elements), in which a configuration and operation of the light source (light-emitting element) is VCSEL array and the cathode of the drive circuit is not separated.

The light source (light-emitting element) is composed of VCSEL array "1" to VCSEL array "n" set by dividing the VCSEL array with the number of "n" ("n" is a positive integer) to divide the light-emitting area into "n" regions. The VCSEL array "1" to VCSEL array "n" respectively form light-emitting region "1" to light-emitting region "n." Further, the VCSEL array "1" to VCSEL array "n" are electrically connected to the cathode (common cathode). In this case, the drive circuit 16B illustrated in FIGS. 7 to 12 cannot be used.

To drive "n" VCSEL arrays, such as VCSEL array "1" to the VCSEL array "n", independently, the light-source drive circuit 16 includes "n" drive circuits 16B-1 to 16B-n, in which "n" light-emitting regions, "n" VCSEL arrays such as VCSEL array "1" to VCSEL array "n", and "n" drive circuit 16B-1 to 16B-n are respectively corresponded with each other.

On the other hand, the light-source drive circuit 16 includes a single power source, such as the power source 16A, and a single control unit, such as the control unit 16C, corresponding to the "n" drive circuits 16B-1 to 16B-n. The "n" drive circuits 16B-1 to 16B-n can be independently controlled by the control unit 16C.

The drive circuit 16B-1 includes a current control unit 16B1-1, a capacitor 16B2-2, and a switch 16B3-1.

The drive circuit 16B-2 includes a current control unit 16B1-2, a capacitor 16B2-2, and a switch 16B3-2.

The drive circuit 16B-n includes a current control unit 16B1-n, a capacitor 16B2-n, and a switch 16B3-n.

The current control unit 16B1-1 to the current control unit 16B1-n can be independently controlled by the control unit 16C, with which the current control unit 16B1-1 to the current control unit 16B1-n can output the current output value independently.

The light-source drive circuit 16 includes a switch 16B7 (main switch SW1), arranged (connected) in series with the "n" VCSEL arrays such as "VCSEL array "1" to VCSEL array "n."

The light-source drive circuit 16 includes a switch 16B3-1 to a switch 16B3-n (sub-switch SW21 to sub-switch SW2n), arranged (connected) in parallel to the "n" VCSEL arrays such as "VCSEL array "1" to VCSEL array "n."

The switch 16B3-1 to the switch 16B3-n (sub-switch SW21 to sub-switch SW2n) are provided independently while corresponding to Anode "1" to Anode "n" of the VCSEL array "1" to VCSEL array "n."

The control unit 16C acquires an intermediate potential voltage for driving the switch 16B3-1 to the switch 16B3-n (sub switch SW21 to sub switch SW2n), and controls the switch 16B3-1 to the switch 16B3-n (sub switch SW21 to sub switch SW2n) using the intermediate potential voltage as a reference voltage.

By controlling the ON-OFF state of the switch 16B3-3 to the switch 16B3-n (sub switch SW21 to sub-switch SW2n) while the switch 16B7 (main switch SW1) is being supplied with the current, the current is supplied to the VCSEL array "1" to VCSEL array "n" or the switch 16B-1 to the switch 16B3-n (sub switch SW21 to sub switch SW2n) corresponding to the VCSEL array "1" to VCSEL array "n". With this configuration, the VCSEL array "1" to VCSEL array "n" are subjected to ON/OFF control.

With this configuration, the current control unit 16B1-1 to the current control unit 16B1-n can constantly supply the desired current, with which the ON/OFF control of VCSEL array "1" to VCSEL array "n" can be performed irrespective of the response speed of the current control unit 16B1-1 to the current control unit 16B1-n (not affected by the response speed).

Figure 14:
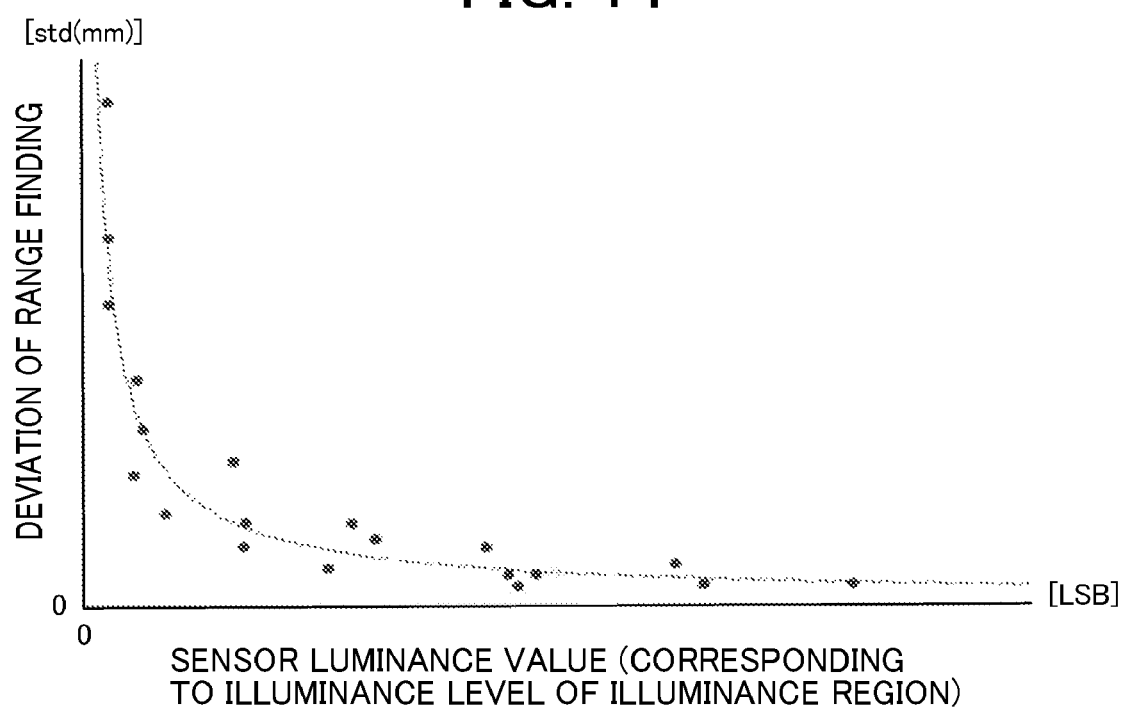
FIG. 14 is a diagram illustrating an example relationship between sensor luminance value, corresponding to illuminance level of illuminance area, and detected range deviation of range-finding image.

FIG. 14 is a diagram illustrating an example relationship between sensor luminance value, corresponding to the illuminance level of the illuminance region (area), and the detected range deviation of range-finding image (luminance image). The sensor luminance value is a value that the sensor outputs when the light reflected from a range-finding target object is received by the sensor. As the illuminance level of range-finding target object increases, the sensor luminance value increases, and thereby the sensor luminance value becomes an index of the illuminance level of the range-finding target object.

In FIG. 14, each plot indicates the actually measured data, and a curve of dashed line illustrates approximate values of the actually measured data. As illustrated in FIG. 14, when the sensor luminance value (illuminance level of the illuminance region (area)) is increased, the detected range deviation decreases exponentially. That is, by increasing the output of the light source (light-emitting element), a range-finding image of higher precision reducing the detected range deviation can be obtained.

The signal control circuit 17 (control unit) integrates and synthesizes a plurality of detection data related to the detection target 12 (target object) detected by switching the plurality of illuminance levels for each of the plurality of illuminance regions.

The signal control circuit 17 integrates and synthesizes high illuminance detection data and low illuminance detection data on the detection target 12 detected by switching between at least the high illuminance level and the low illuminance level for each of the plurality of illuminance regions.

Hereinafter, a description is given of a case of setting the high illuminance region by the high illuminance level and the low illuminance region by the low illuminance level for each of the plurality of illuminance regions, and integrating and synthesizing a high-precision range-finding image obtained at the high illuminance region and a low-precision range-finding image obtained at the low illuminance region.

The "detection data" means that the light received by the light-receiving element 13 is converted by the photoelectric conversion into electric signals. For example, when considering one illuminance region, the high-precision range-finding image detected at the high illuminance region by the high illuminance level and the low-precision range-finding image detected at the low illuminance region by the low illuminance level becomes two detection data of the detection target 12 detected by switching between the high illuminance level and the low illuminance level.

Further, "integrating/synthesis" means at least any one of "integration and synthesis (integration and/or synthesis)." That is, "integrating/synthesis" may include processing of simply adding a part or all of a plurality of detection data (e.g., high-precision range-finding image and low-precision range-finding image), and processing of performing a special operation on the detection data such as image processing on the detection data. As to an example of the special operation, the signal control circuit 17 can perform given weighting processing on the high illuminance detection data (high-precision range-finding image) when integrating or synthesizing the high illuminance detection data (high precision range-finding image) and the low illuminance detection data (low precision range-finding image).

For example, the high illuminance detection data (high precision range-finding image) and the low illuminance detection data (low precision range-finding image) can be integrated/synthesized by amplifying the high illuminance detection data (high precision range-finding image) and/or attenuating the low illuminance detection data (low precision range-finding image).

Further, as to the weighting processing, it is suffice to set a higher priority on the high illuminance detection data (high precision range-finding image), in which the weighting processing may include using average value of data or convolution of data in place of and/or in addition to the amplification or attenuation of the detection data.

FIG. 15 is a diagram illustrating a first example of integration/synthesis process of a plurality of detection data by the signal control circuit 17. In FIG. 15, two illuminance regions are set, such as one on the left side and one on the right side, and the illuminance level of each illuminance region is switched with an interval of time Δt.

Specifically, at time t=0, the illuminance region on the left side is set as a high illuminance region (1), and the illuminance region on the right side is set as a low illuminance region (1)'. In this case, a high-precision range-finding image (1) acquired or obtained from the high illuminance region (1) becomes a high-precision acquired image (1) (integration/synthesis processing is not performed). Further, a low precision range-finding image (1)' acquired or obtained from the low illuminance region (1)' becomes a low-precision acquired image (1)' (integration/synthesis processing is not performed).

Then, at time t=Δt, the illuminance region on the left side is set as a low illuminance region (2), and the illuminance region on the right-hand side is set as a high illuminance region (2)'. In this case, a low-precision range-finding image (2) acquired or obtained from the low illuminance region (2) is synthesized with the high-precision range-finding image (1) obtained at time t=0, and the resultant synthesized high-precision acquired image (1)+(2) is obtained.

Further, a high precision range-finding image (2)' acquired or obtained from the high illuminance region (2)' is synthesized with the low-precision range-finding image (1)' obtained at time t=0, and the resultant synthesized high-precision acquired image (1)'+(2)' is obtained.

In this synthesis processing, the weighting processing may be performed on the high-precision range-finding image (1) and the high-precision range-finding image (2)'.

Then, at time t=2Δt, the illuminance region on the left side is set as a high illuminance region (3), and the illuminance region on the right-hand side is set as a low illuminance region (3)'. In this case, a high-precision range-finding image (3) acquired or obtained from the high illuminance region (3) is synthesized with the low-precision range-finding image (2) obtained at time t=Δt, and the resultant synthesized high-precision acquired image (2)+(3) is obtained.

Further, a low-precision range-finding image (3)' acquired or obtained from the low illuminance region (3)' is synthesized with the high-precision range-finding image (2)' obtained at time t=Δt, and the resultant synthesized high-precision acquired image (2)'+(3)' is obtained.

In this synthesis processing, the weighting processing may be performed on the high-precision range-finding image (3) and the high-precision range-finding image (2)'.

As above described, by setting the high illuminance region where the intensity of the irradiation light is relatively high and the low illuminance region where the intensity of the irradiation light is relatively low, and by switching the high illuminance region and the low illuminance region, the detection data (range-finding image) is acquired or obtained.

Then, the high precision detection data (range-finding image) can be obtained by integrating or synthesizing the detection data corresponding to the high illuminance region and the low illuminance region.

Further, different from conventional optical scanning unit (e.g., MEMS mirror), although the high illuminance region and the low illuminance region are set for the of the embodiment while the illuminance regions configuring the entire illuminance area (e.g., E3) are constantly irradiated.

By using the above described method, the high precision image can be acquired or obtained by constantly illuminating the entire illuminance area (e.g., E3), with which the high-precision range-finding image can be acquired or obtained without lowering the image acquisition time (FPS) compared to the conventional optical scanning method.

Further, by individually driving a plurality of the light-emitting regions, the current consumption can be reduced and the heat generation amount of the light source can be reduced compared to the conventional method of constantly illuminating the entire area at higher illuminance level. In this description, the high illuminance region and the low illuminance region represent a relative difference of illuminance level, and the high illuminance region and the low illuminance region can be optionally determined by changing the light output of the light-emitting element in accordance with the desired precision of the range-finding image.

The signal control circuit 17 (control unit) further integrates or synthesizes a plurality of detection data (the synthesized high-precision acquired image corresponding to each of the illuminance regions) related to the detection target 12 (target object) to acquire a single detection data on the detection target 12. As a the result, the high precision detection data (e.g., ranging data) on the detection target 12 can be acquired or obtained.

Figure 18:
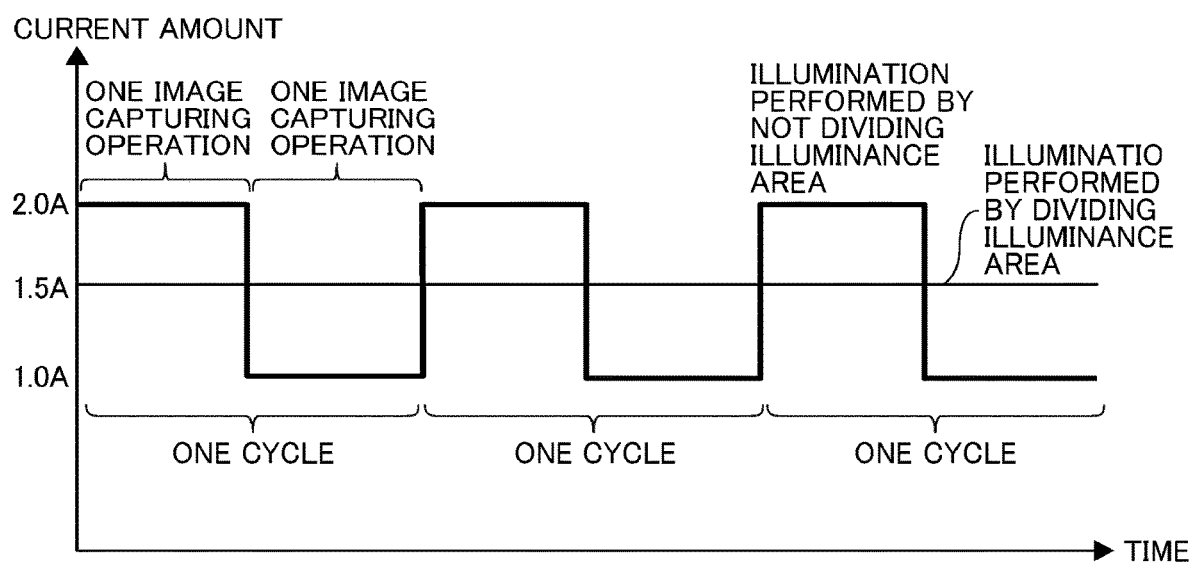
FIG. 18 is a conceptual diagram for describing reduction of current amount per image capturing operation when illumination is performed by dividing an illuminance area into a plurality of illuminance regions.

Hereinafter, with reference to FIGS. 16, 17 and 18, a description is given of reduction of current consumption (e.g., instantaneous current amount) per image capturing operation by performing the area-dividing illumination.

As described with reference to FIG. 15, by dividing the illuminance area into the plurality of illuminance regions, by switching the high illuminance region and the low illuminance region sequentially, by acquiring or obtaining the detection data (e.g., ranging data), and by acquiring or obtaining the synthesized image, the high precision range-finding image can be acquired or obtained.

In this configuration, the detection data (e.g., ranging data) can be acquired or obtained by switching the high illuminance level and the low illuminance level without dividing the illuminance area. However, the current amount per image capturing operation can be reduced by dividing the illuminance area into the plurality of illuminance regions to acquire or obtain the detection data (e.g., ranging data).

FIG. 16 is a conceptual diagram illustrating the current amount per image capturing operation when the illumination is performed by dividing the illuminance area into a plurality of illuminance regions.

FIG. 17 is a conceptual diagram illustrating the current amount per image capturing operation when the illumination is performed without dividing the illuminance area into a plurality of illuminance regions.

In FIG. 16 and FIG. 17, the current amount required for illuminating the high-illuminance level for a given size of illuminance area (unit illuminance area) is indicated by 2, the current amount required for illuminating the low-illuminance level for the given size of illuminance area (unit illuminance area) is indicated by 1, and a size of the illuminance area (size of illuminated area) is denoted by A.

In FIG. 16, the illuminance area is divided into two illuminance regions, one on the left side and one on the right side, and the image capturing operation is performed for three times with an interval of time Δt (i.e., three times of image capturing operation performed at t=0, t=Δt, t=2Δt) by switching the high illuminance region and the low illuminance region. Then, each high-precision range-finding image is obtained by synthesizing images obtained by performing two times of image capturing operation, and this processing is referred to as one cycle or one routine.

As illustrated in FIG. 16, when the illumination is performed by dividing the illuminance area into the plurality of illuminance regions, the amount of light required for each image capturing operation expressed by the current amount becomes 2×0.5 A=1 A for the high illuminance region, the amount of light required for each image capturing operation expressed by the current amount becomes 1×0.5 A=0.5 A for the low-illuminance region, and the amount of light required for the entire illuminance area becomes 1.5 A.

Further, the amount of light required for each image capturing operation expressed by the current amount also becomes 1.5 A even when the high illuminance region and the low-illuminance region are switched (i.e., constant at 1.5 A). Therefore, the amount of light required for the entire illuminance area becomes 1.5 A×2=3 A for the one cycle or one routine (i.e., two times of image capturing operation).

As illustrated in FIG. 17, when the illumination is performed without dividing the illuminance area into the plurality of illuminance regions, the entire illuminance are illumined by switching the high illuminance level and the low illuminance level. In this case, the amount of light required for each image capturing operation expressed by the current amount becomes 2×A=2 A for the high illuminance region, and the amount of light required for each image capturing operation expressed by the current amount becomes 1×A=1 A for the low-illuminance region. Therefore, the amount of light required for the entire illuminance area becomes 3 A for the one cycle or one routine (i.e., two times of image capturing operation).

Therefore, the amount of light required for the one cycle or one routine become the same (e.g., 3 A in FIG. 16 and FIG. 17), and further the amount of light required for the entire image capturing operation become the same even when the illumination is performed by dividing the illuminance area into the plurality of illuminance regions or the illumination is performed without dividing the illuminance area into the plurality of illuminance regions. However, the amount of light required for each image capturing operation can be reduced when the illumination is performed by dividing the illuminance area into the plurality of illuminance regions (see FIG. 18).

If the instantaneous light amount can be reduced, that is, the current amount applied to the light source element can be reduced, the maximum current amount applied to the light-source drive circuit can be reduced. By reducing the maximum current amount, a size of field-effect transistor (FET) configuring the light-source drive circuit can be reduced.

Further, by reducing the maximum current amount, the input voltage of the light-source drive circuit can be set to a lower voltage, with which electronic components configuring the light-source drive circuit can use electronic components having a lower rated voltage, and a size of the light-source drive circuit can be downsized or reduced.

Further, in order to perform the high frequency drive for the indirect TOF, the rising time characteristic and the falling time characteristic of the current flowing to the drive circuit is required to be sufficiently shorter than a period cycle of driving. As to the high-frequency circuit for performing the high-frequency driving, the influence of parasitic component (e.g., parasitic inductance) included in the drive circuit is required to be reduced, in which the downsizing of the drive circuit is effective.

Figure 19:
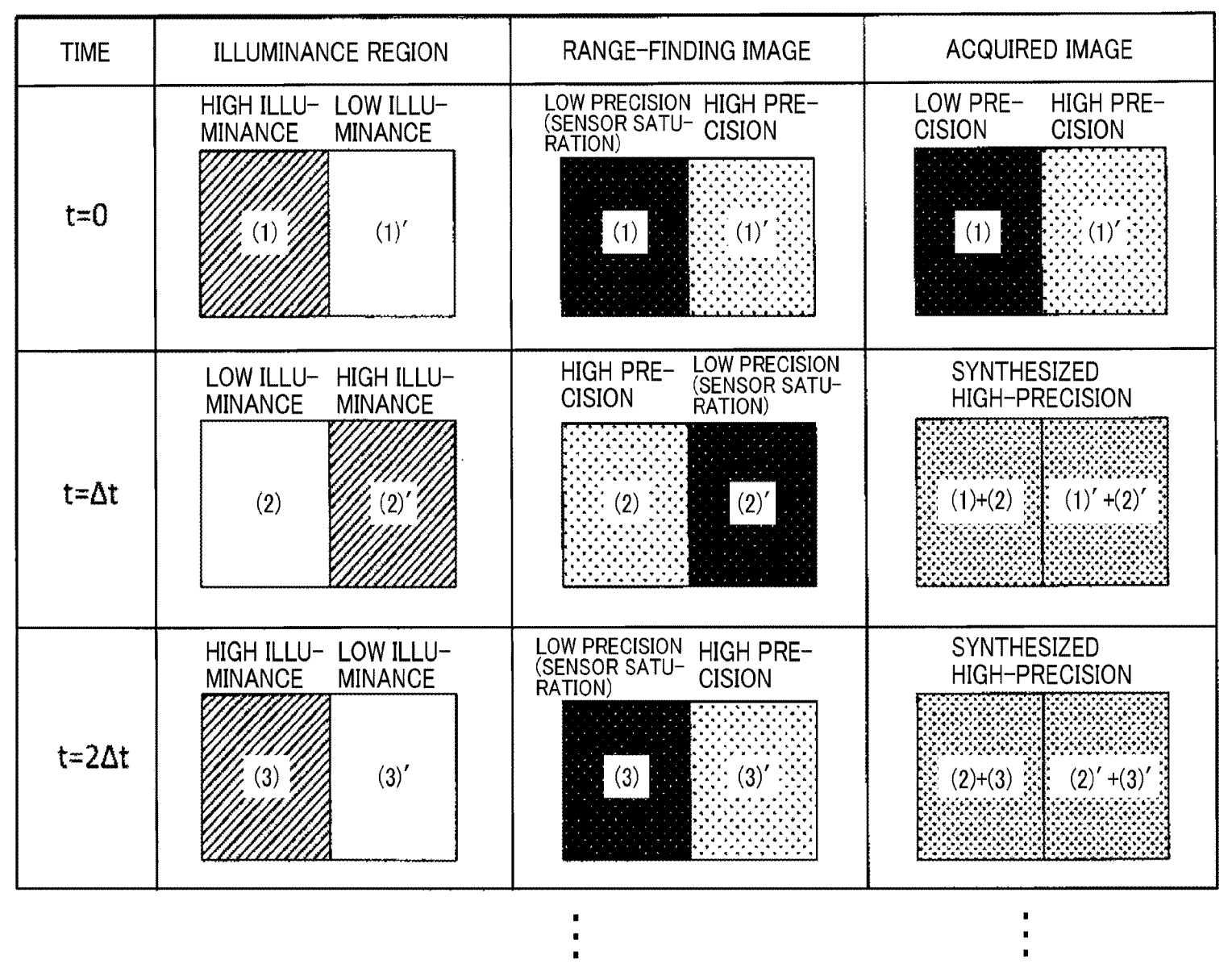

FIG. 19 is a diagram illustrating a second example of integration/synthesis process of a plurality of detection data by the signal control circuit 17. The description that overlaps with FIG. 15 (first example) is omitted.

As to the range fining operation using the TOF camera, the higher the illuminance level at the illuminance region, the more sufficient amount of reflection light is incident onto the sensor, thereby improving the precision of range finding. However, if the object is too close to the TOF camera or the reflectance from the object is too high, or the intensity of the reflection light becomes too strong, the sensor may saturate due to the too strong intensity of the reflection light, with which the precision of the range-finding image may deteriorate. That is, if the saturation of sensor occurs, the high-precision range-finding image may not be always acquired or obtained from the high illuminance region, and the low-precision range-finding image may not be always acquired or obtained from the low illuminance region.

In the second example of FIG. 19, due to the saturation of sensor, the quality of the range-finding image acquired or obtained from the high illuminance region deteriorates, and thereby the range-finding image acquired or obtained from the high illuminance region is set as the low-precision range-finding image, and the low-precision range-finding image in the normal state is set as the high-precision range-finding image. With this configuration, the high-precision range-finding image can be acquired or obtained for the entire illuminance area (e.g., E3) even if the saturation of sensor occurs.

Specifically, at time t=0, the illuminance region on the left side is set as a high illuminance region (1), and the illuminance region on the right side is set as a low illuminance region (1)'. However, due to the saturation of sensor, a range-finding image acquired or obtained from the high illuminance region (1) becomes a low precision range-finding image (1), and further becomes a low-precision acquisition mage (1) (integration/synthesis processing is not performed). Further, a range-finding image acquired or obtained from the low illuminance region (1)' exceptionally becomes a high precision range-finding image (1)', and further becomes a high-precision acquired image (1)' (integration/synthesis processing is not performed).

Then, at time t=Δt, the illuminance region on the left side is set as a low illuminance region (2), and the illuminance region on the right-hand side is set as a high illuminance region (2)'. However, due to the saturation of sensor, a range-finding image acquired or obtained from the high illuminance region (2)' becomes a low precision range-finding image (2)', and a range-finding image acquired or obtained from the low illuminance region (2) exceptionally becomes a high precision range-finding image (2). In this case, the high-precision range-finding image (2) is synthesized with the low-precision range-finding image (1) obtained at time t=0, and the resultant high-precision acquired image (1)+(2) is obtained.

Further, the low-precision range-finding image (2)' is synthesized with the high-precision range-finding image (1)' obtained at time t=0, and the resultant synthesized high-precision acquired image (1)'+(2)' is obtained.

In this synthesis process, the weighting processing may be performed on the high precision range-finding image (1)' and the high precision range-finding image (2).

Then, at time t=2Δt, the illuminance region on the left side is set as a high illuminance region (3), and the illuminance region on the right-hand side is set as a low illuminance region (3)'. However, due to the saturation of sensor, a range-finding image acquired or obtained from the high illuminance region (3) becomes a low precision range-finding image (3), and a range-finding image acquired or obtained from the low illuminance region (3)' exceptionally becomes a high precision range-finding image (3)'. In this case, the high-precision range-finding image (3)' is synthesized with the low-precision range-finding image (2)' obtained at time t=Δt, and the resultant synthesized high-precision acquired image (2)'+(3)' is obtained.

Further, the low-precision range-finding image (3) is synthesized with the high-precision range-finding image (2) obtained at time t=Δt, and the resultant synthesized high-precision acquired image (2)+(3) is obtained.

In this synthesis processing, the weighting processing may be performed on the high-precision range-finding image (2) and the high-precision range-finding image (3)'.

Figures 20A, 20B, 20C:
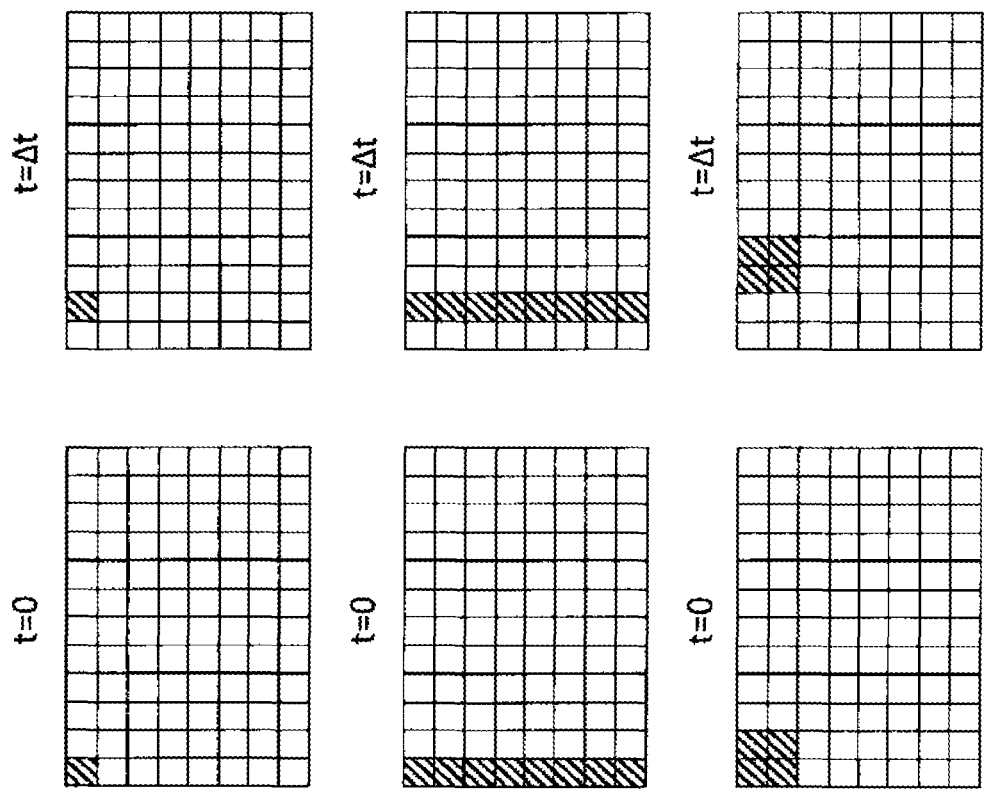
FIGS. 20A, 20B, and 20C are diagrams illustrating examples of switching pattern of high illuminance region and low illuminance region for a plurality of illuminance regions.

FIGS. 20A, 20B, and 20C are diagrams illustrating examples of switching pattern of the high illuminance region and the low illuminance region for the plurality of illuminance regions. In FIGS. 20A, 20B, and 20C, the plurality of illuminance regions are arranged in a matrix form of a total of 96 blocks consisting of 8 longitudinal blocks×12 lateral blocks. In FIGS. 20A, 20B, and 20C, blocks with hatching indicate the high illuminance region, and blocks without hatching indicate the low illuminance region. In FIGS. 20A, 20B, and 20C, it is assumed that the time line proceeds from the left to the right as a time-series system.

In FIG. 20A, one block at the upper-left-corner is set as the high illuminance region and the other blocks are set as the low illuminance region as an initial state. Then, the high illuminance region block is shifted to the right side, and when the high illuminance region block reaches the block at the upper-right-corner block, the high illuminance region block is set lowered for one line, and then shifted to an end block at the left end as a shift pattern or switching pattern.

In FIG. 20B, eight blocks of one column at the left end is set as the high illuminance region and the other blocks are set as the low illuminance region as an initial state. Then, the eight-block high illuminance region is shifted to the right side from the initial state as a shift pattern or switching pattern.

In FIG. 20C, a total of four blocks (two vertical blocks× two lateral blocks) is set as the high illuminance region at the upper left corner and the other blocks are set as the low illuminance region as an initial state. Then, the four-block high illuminance region is shifted to the right side, and when the four-block high illuminance region block reaches the four blocks at the upper-right-corner, the four-block high illuminance region block is set lowered for two lines, and then shifted to the left end as a shift pattern or switching pattern.

The switching patterns of the high illuminance region and the low illuminance region for the plurality of illuminance regions are not limited to those illustrated in FIGS. 20A, 20B, and 20C, but various design modifications can be performed. For example, when a plurality of blocks of the high illuminance region are shifted, a shift can be performed while overlapping a part of the plurality of blocks. In this case, as to the overlapped blocks of high illuminance region, the high-precision detection data (e.g., ranging data) can be obtained when the integration/synthesis processing is performed.

Figure 21A:
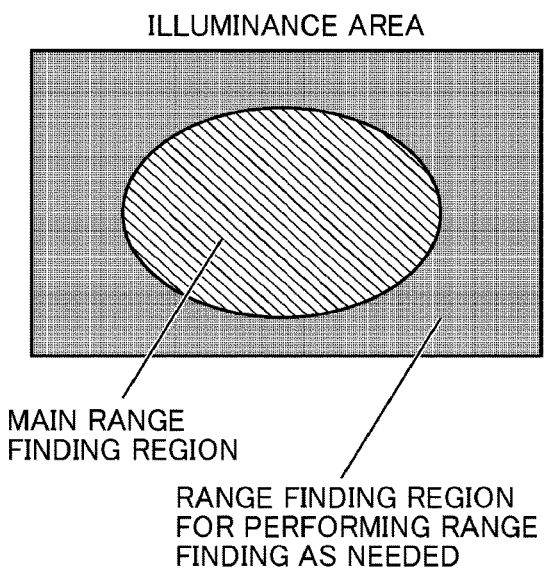
FIG. 21A illustrates an example of an illuminance area when the illumination methods described in FIGS. 20A, 20B, and 20C are performed.
Figure 21B:
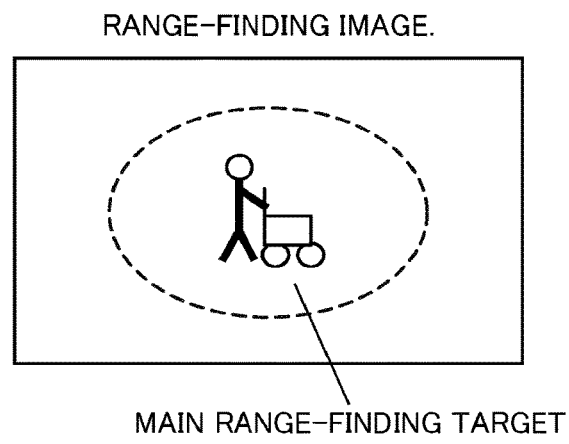
FIG. 21B illustrates an example of range-finding image when the illumination methods described in FIGS. 20A, 20B, and 20C are performed.

FIG. 21 is a diagram for describing an example of illumination methods described in FIGS. 20A, 20B, and 20C. FIG. 21A illustrates an example of an illuminance area when the illumination methods described in FIGS. 20A, 20B, and 20C are performed, and FIG. 21B illustrates an example of range-finding image when the illumination methods described in FIGS. 20A, 20B, and 20C are performed.

In this description, when the range-finding image of a target region is to be acquired or obtained using the TOF camera, the center portion of the field of view is assumed to be the main range finding region for performing the range finding operation, and the peripheral portion is assumed to be the range finding region for performing the range finding operation as needed.

For example, when monitoring the transport works in a factory, if a movable range of movable apparatus or object, such as autonomous transport apparatus or person, which is the target of range finding (range finding target), is within the center of the field of view, the range finding target can be constantly monitored with higher precision by performing the range finding at the center portion alone.

However, if a system is required to issue a warning when another object, such as another person or another movable apparatus, approaches to the range finding target unexpectedly, the system is preferably required to simultaneously perform the range finding for a wider angle of view and to detect another object approaching to the range finding target with higher precision.

In this case, if the illumination is performed by dividing the illuminance area into the center portion and the peripheral portion of the field of view and by switching the high illuminance level and the low illuminance level for the center portion and the peripheral portion to perform the range finding, the range finding operation can be performed without illuminating the entire field of view with the high illuminance level to obtain a high-precision ranging image, with which the current amount required for each image capturing operation can be reduced.

In this configuration, the high illuminance level and the low illuminance level can be switched for the center portion and the peripheral portion for each image capturing operation to acquire or obtain the high-precision range-finding image. Further, the illumination can be performed by illuminating the center portion with the high illuminance level at most of the time during a plurality times of image capturing operation while switching the high illuminance level and the low illuminance level for the center portion and the peripheral portion at each given timing that is set with a given time interval during the plurality times of image capturing operation, and by setting the weight to the range-finding image to acquire or obtain the high-precision range-finding image.

FIG. 22 is an example of a flowchart of range-finding processing (detection processing) performed by the range finding apparatus 10 (detection apparatus) according to the embodiment.

In step ST1, the first-time range-finding image is acquired.

In step ST2, the high illuminance region and the low illuminance region are switched for each of a plurality of illuminance regions in a manner different from step ST1.

In step ST3, the second-time range-finding image is acquired, in which the second-time range-finding image is an example of n-th time range-finding image.

In step ST4, a process of determining the amount of light received by the sensor is performed. Specifically, it is determined whether or not the saturation of sensor is detected and whether the illuminance level is at a given level for achieving the desired precision of range finding based on data of the amount of light received by the sensor that is acquired by performing the range finding processing.

In a case of the synthesizing high-precision range-finding image, in step ST5, the weighting is performed by determining a weighting coefficient of the range-finding image for the high illuminance region.

Then, in step ST6, the range-finding images acquired by performing the range finding processing are synthesized as the synthesized range-finding image.

In step ST7, it is determined whether the range-finding processing is further continued. Specifically, the determination of continuing the range-finding processing is performed based on whether or not a plurality of detection data, detected by switching all of the illuminance levels for all of the illuminance regions, are integrated/synthesized.

If it is determined that the range-finding processing is to be continued based on the determination of continuing the range-finding processing (step ST7: YES), the processing loop of steps ST2 to ST6 is repeated. In this case, the range-finding image acquiring processing in step ST3 is performed for "n" times ("n" is a positive integer) in line with or according to the number of repeating the processing loop, and the range-finding image synthesis process in step ST6 is performed for "m" times ("m" is a positive integer) in line with or according to the number of repeating the processing loop.

If it is determined that the range-finding processing is to be terminated based on the determination of continuing the range-finding processing (step ST7: NO), the range-finding processing is terminated.

Further, if the saturation of sensor occurs, in step ST5, the weighting is performed on a region corresponding to the low illuminance region, and in step ST6, the range-finding images acquired or obtained by performing the range finding processing are synthesized to prevent an error in the range-finding image caused by the saturation of sensor.

Further, when the latest range-finding processing information with respect to the time line is prioritized, that is, when the range-finding processing is performed for a moving object, it is desirable to synthesize the latest range-finding images as much as possible regardless of whether the latest range-finding images are high precision images or low precision images.

By performing the above-described range-finding processing, the high-precision range-finding image can be acquired or obtained for each of the plurality of illuminance regions. Further, since various parameters, such as precision of range finding and time information, can be arbitrarily determined by a person or entity who performs the range-finding processing, a user-friendly and flexible range-finding processing can be performed.

As to the above described embodiment, the light source device 11 divides the illuminance area of light on the detection target 12 (target object), irradiated by the plurality of surface-emitting laser elements 21 (light-emitting elements), into a plurality of illuminance regions (discrete illuminance regions), and irradiates the plurality of illuminance regions.

The light-source drive circuit 16 (light source drive unit) switches a plurality of illuminance levels for each of the plurality of illuminance regions.

The signal control circuit 17 (control unit) integrates or synthesizes a plurality of detection data related to the detection target 12 (target object) detected by switching the plurality of illuminance levels for each of the plurality of illuminance regions.

With this configuration, the range-finding apparatus (detection apparatus) and the range-finding method (detection method) that can reduce power consumption and heat generation, secure wider field of view (FOV) and higher precision, and efficient image acquisition time (e.g., shorter image acquisition time), can be provided.

For example, in the embodiment, as to the illumination method using the TOF camera, the illuminance area is divided into the plurality of illuminance regions, and an illumination light source unit, capable of irradiating the respective illuminance regions using the independent optical output, performs the illumination for the high illuminance region and the low illuminance region separately. By switching the high illuminance region and the low illuminance region at given time intervals, the range-finding data is acquired. By integrating the range-finding data obtained when the irradiation light intensity is high while setting (referencing) a weight for the range-finding data obtained when the irradiation light intensity is high, the precision of range finding of the entirety of range finding region (range finding target region) can be enhanced or improved.

Further, the above described embodiment can reduce the deterioration of FPS, and the power consumption and heat generation.

Further, since the detected range deviation of the range-finding image can be reduced by increasing the illuminance level of the target object by performing the range finding processing using the TOF camera (setting a time period in which the irradiation light intensity is set strong at any illuminance region), the precision of range finding can be enhanced or improved. By illuminating the each of the illuminance regions (set by dividing the illuminance area) by increasing the intensity of the irradiation light sequentially, the detected range deviation of the range-finding image can be reduced by constantly illuminating the range finding region (range finding target region), with which the precision of range finding can be enhanced or improved.

Hereinafter, with reference to FIGS. 23 to 27, a description is given of examples applying the above described ranging device 10 for various electronic apparatuses. The application examples includes a detection apparatus 50 having a basic configuration similar to the range finding apparatus 10. Specifically, the detection apparatus 50 replaces the signal control circuit 17 of the range finding apparatus 10 of FIG. 1 with the respective functional blocks to be described later while the other basic configuration is the same as that of the range finding apparatus 10.

In the detection apparatus 50, the light-receiving element 13 illustrated in FIG. 1 is a detection unit for detecting light emitted from the light source device 11 and reflected from the detection target 12. Further, in FIGS. 23 to 27, a functional block such as a determination unit provided by the detection apparatus 50 is described outside the detection apparatus 50 due the space limitation in the drawings.

Figure 23:
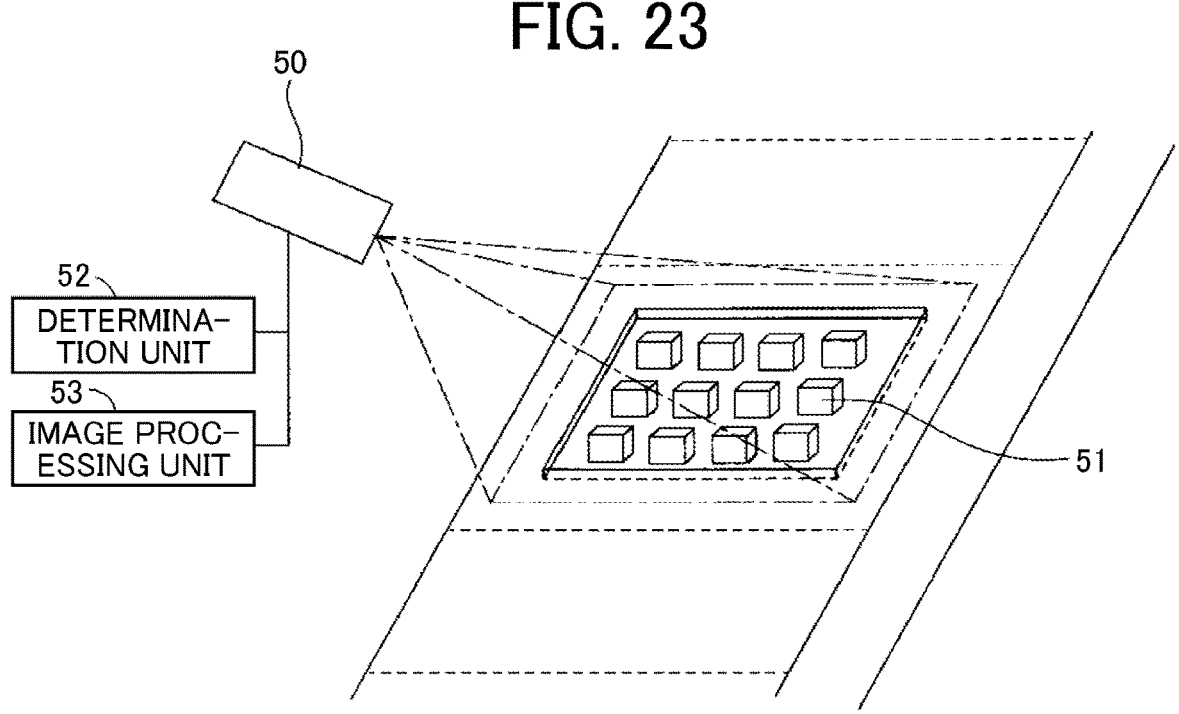
FIG. 23 illustrates an application example of a detection apparatus according to an embodiment used for inspecting products.

FIG. 23 illustrates an application example of the detection apparatus 50 used for inspecting products in a factory. The light emitted from the light source device 11 of the detection apparatus 50 is projected onto the illuminance area that covers a plurality of articles 51, and the reflected light is received by the detection unit (light-receiving element 13). Based on information detected by the detection unit (light-receiving element 13), the determination unit 52 determines the state of each article 51.

Specifically, the image processing unit 53 generates the image data (image information of the illuminance area illuminated by the light emitted from the light source device 11) based on electric signals converted by the photoelectric conversion by the light-receiving element 13, and then the determination unit 52 determines the state of each article 51 based on the generated image information. That is, the light-receiving optical system 18 and the light-receiving element 13 in the detection apparatus 50 can function as imaging unit for imaging the projection area of the light projected from the light source device 11. The determination unit 52 can determine the state of the article 51 based on the information on captured image using known image analysis methods, such as pattern matching.

As to the application example of FIG. 23, by using the detection apparatus 50 (the light source device 11) capable of projecting the light with a uniform illuminance level onto the illuminance area, the deviation of illuminance level can be reduced even if the light is irradiated with a wider angle. As a result, a larger number of articles 51 can be inspected at one time, with which the inspection work efficiency can be improved.

Further, by using the detection apparatus 50 that performs the detection using the TOF, information on the front side of each article 51 (the side facing the detection apparatus 50) and information on the depth direction of each article 51 can be obtained. Therefore, compared to the external inspection method using conventional imaging devices, fine scratches, defects, three-dimensional shapes or the like on the article 51 can be easily identified, and the inspection precision can be enhanced or improved.

Further, since the light emitted from the light source device 11 of the detection apparatus 50 is illuminated ono the illuminance area including the article 51, which is the inspection target, the detection apparatus 50 can be used under a darker environment.

Figure 24:
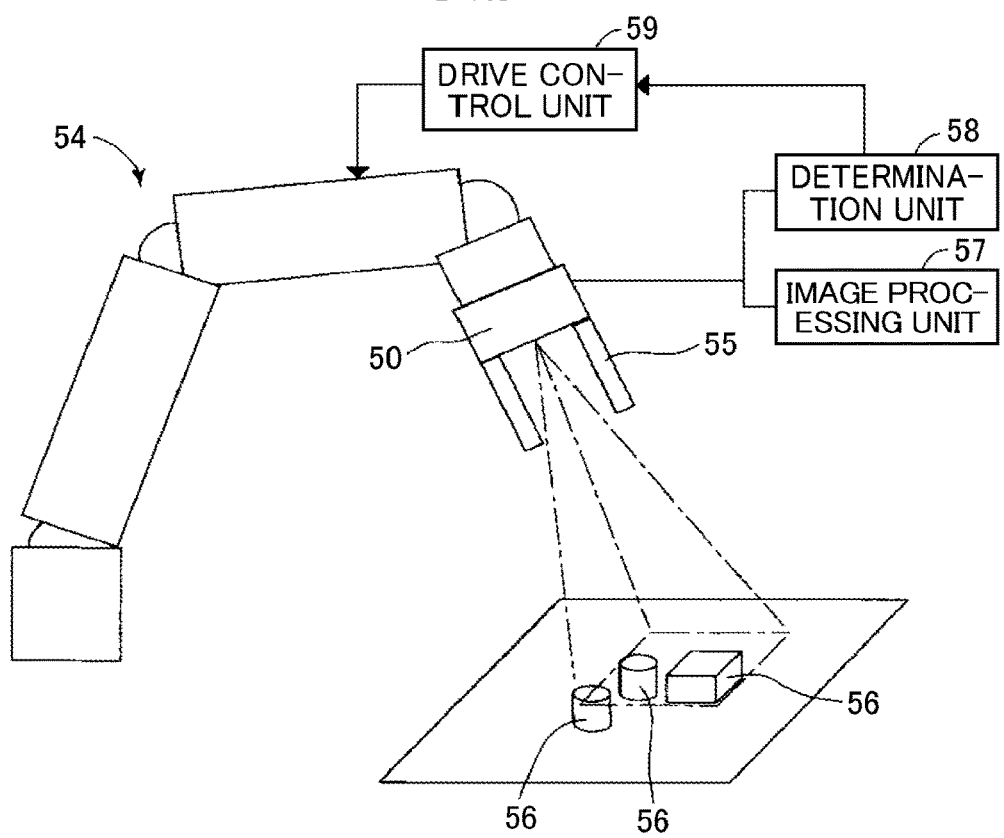
FIG. 24 illustrates another application example of a detection apparatus according to an embodiment applied for controlling a movable apparatus.

FIG. 24 illustrates another application example of the detection apparatus 50 applied for controlling a motion of movable apparatus. A multi joint arm 54 (an example of movable apparatus) has a plurality of arms connected by bendable joints, and has a hand 55 at an end of the multi joint arm 54. The multi joint arm 54 is used, for example, in assembly lines of factories to hold an object 56 using the hand 55 when to inspect, transport, and assemble the object 56.

The detection apparatus 50 is mounted near the hand 55 of the multi joint arm 54. The detection apparatus 50 is provided so that the projection direction of light is aligned to the direction of the hand 55, and the object 56 and a peripheral region of the object 56 are detected as the detection target.

The detection apparatus 50 receives light reflected from the illuminance area including the object 56 using the light-receiving element 13, generates the image data using the image processing unit 57 (perform imaging), and then determines various information on the object 56 based on the obtained image information using the determination unit 58. Specifically, the information detected by the detection apparatus 50 is, for example, the distance to the object 56, the shape of the object 56, the position of the object 56, and the positional relationship of a plurality of the objects 56. Then, the drive control unit 59 controls the operation of the multi joint arm 54 and the hand 55 based on the determination result obtained by the determination unit 58 to hold and move the object 56.

As to the application example of FIG. 24, with respect to the detection of the object 56 by the detection apparatus 50, the effect similar to that of the detection apparatus 50 of FIG. 23 (improvement of detection precision) can be obtained.

Further, by mounting the detection apparatus 50 on the multi joint arm 54 (especially, near the hand 55), the object 56, which is the target object of holding or gripping, can be detected from the near-distance, with which the detection precision and recognition precision can be improved compared to the detection method using the imaging apparatus arranged at a position away from the multi-joint arm 54.

Figure 25:
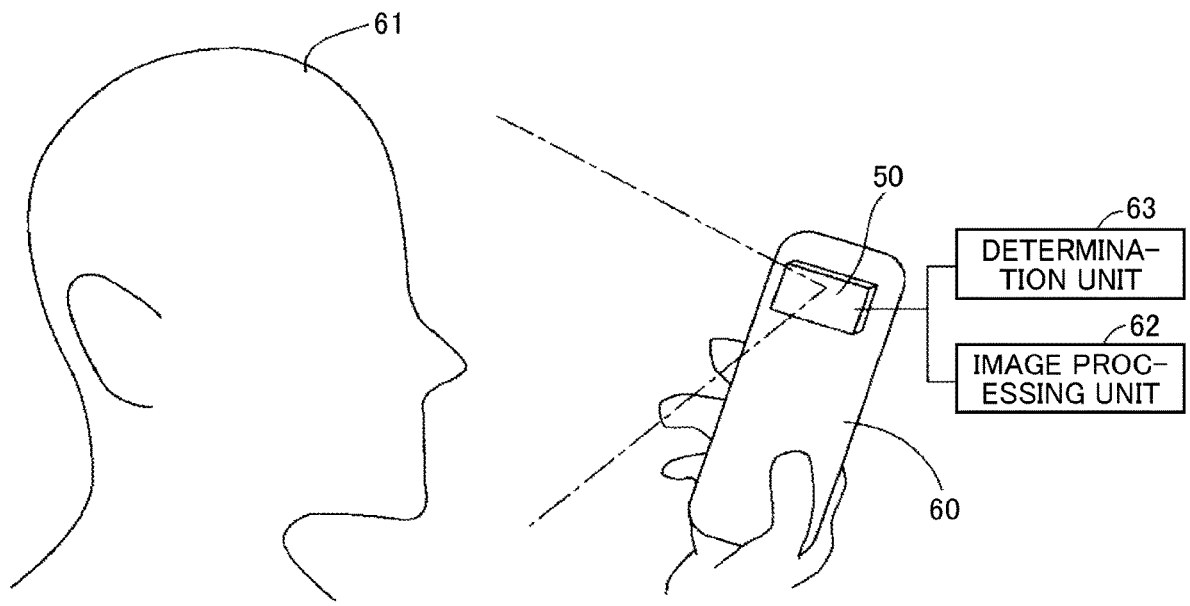
FIG. 25 illustrates another application example of a detection apparatus according to an embodiment applied for user authentication of electronic device.

FIG. 25 illustrates another application example of the detection apparatus 50 applied for the user authentication of electronic device. A portable information terminal 60, which is an electronic device, has an authentication function of user. The authentication function may be implemented using the dedicated hardware, or by executing a program stored on a read only memory (ROM) using a central processing unit (CPU) that controls the portable information terminal 60.

When performing the user authentication, light is projected from the light source device 11 of the detection apparatus 50 mounted on the mobile information terminal 60 toward a user 61 using the portable information terminal 60. Then, the light reflected from the user 61 and around the user 61 is received by the light-receiving element 13 of the detection apparatus 50, and then image data is generated by the image processing unit 62 (performing imaging).

Then, the determination unit 63 determines a matching level of the image information of the user 61 captured by the detection apparatus 50 and the user information registered in advance to determine whether the user 61 is a registered user. Specifically, by measuring the shape (e.g., contour, concave, convex) of face, ears, head, or the like of the user 61, the measured information can be used as the user information.

As to the application example of FIG. 25, with respect to the detection of the user 61 by the detection apparatus 50, the effect similar to that of the detection apparatus 50 of FIG. 23 (improvement of detection precision) can be obtained. In particular, since the information of the user 61 can be detected in a wider range by projecting the light from the light source device 11 with a wider angle and uniform illuminance level, the amount of information for recognizing the user becomes greater than the amount of information when the detection range is narrower, with which the recognition precision can be improved.

FIG. 25 is the application example in which the detection apparatus 50 is mounted on the portable information terminal 60, but the user authentication using the detection apparatus 50 can be applied to office automation (OA) devices, such as personal computers, printers, security systems of buildings or the like.

Further, the detection apparatus 50 can be used for scanning three-dimensional shape, such as face, in addition to the function of authentication function of user. In this case too, the high-precision scanning can be implemented by mounting the detection apparatus 50 (light source device 11) capable of projecting the light with a wider angle and uniform illuminance level.

Figure 26:
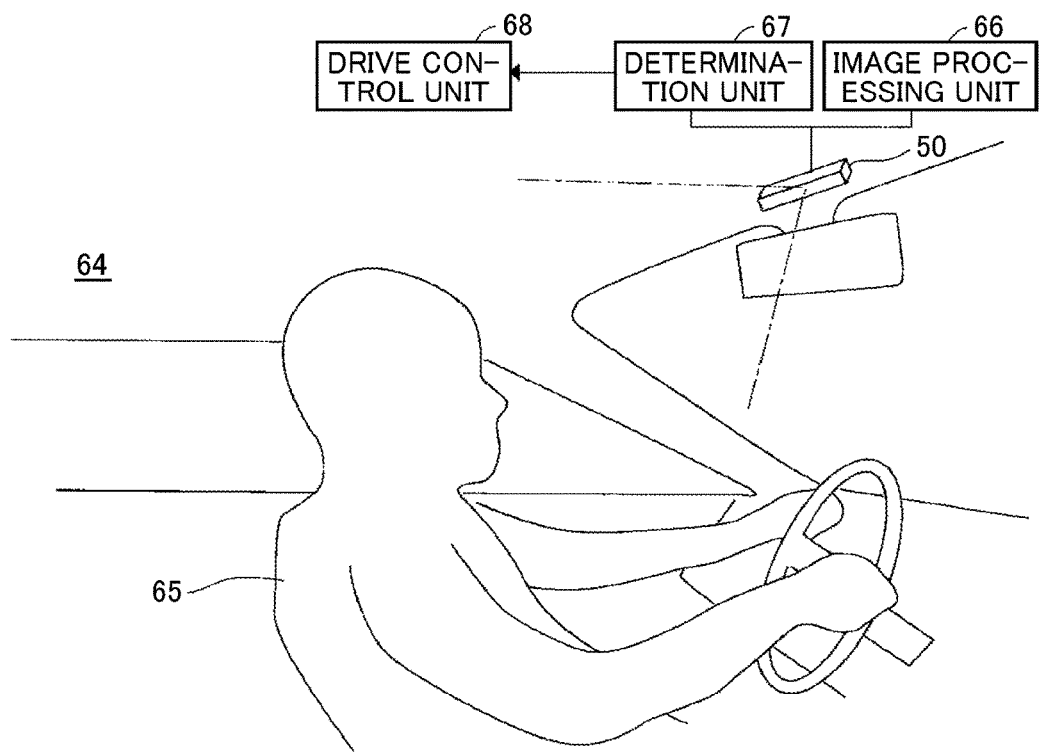
FIG. 26 illustrates another application example of a detection apparatus according to an embodiment applied for a driving assist system of moveable apparatus.

FIG. 26 illustrates another application example of the detection apparatus 50 applied for a driving assist system of a moveable apparatus, such as automobile 64. The automobile 64 is equipped with a driving assist function capable of automatically performing a part of driving operation, such as deceleration and steering. The driving assist function may be implemented using the dedicated hardware, or by executing a program stored on a read only memory (ROM) using an electronic control unit (ECU) that controls the electric system of the automobile 64.

The light is projected toward the driver 65 driving the automobile 64 from the light source device 11 of the detection apparatus 50 mounted in the automobile 64. Then, the light reflected from the driver 65 and around the driver 65 is received by the light-receiving element 13 of the detection apparatus 50, and then image data is generated by the image processing unit 66 (performing imaging).

Then, the determination unit 67 determines information, such as face (facial expression) and posture of the driver 65 based on the image information capturing the driver 65.

Then, based on the determination result of the determination unit 67, the drive control unit 68 controls the brake or wheel steering, and appropriately performs the driving assist in accordance with the situation of the driver 65. For example, the drive control unit 68 can control the automatic deceleration or automatic stop when detecting the inattentive driving or drowsy driving of the driver 65.

As to the application example of FIG. 26, with respect to the state detection of the driver 65 by the detection apparatus 50, the effect similar to that of the detection apparatus 50 of FIG. 23 (improved detection precision) can be obtained. In particular, since the information of the driver 65 can be detected in a wider range by projecting the light from the light source device 11 with a wider angle and uniform illuminance level, the amount of information for recognizing the driver 65 becomes greater than the amount of information when the detection range is narrower, with which the precision of the driving assist can be improved.

FIG. 26 is the application example in which the detection apparatus 50 is mounted on the automobile 64, but the detection apparatus 50 can be applied to any movable apparatus, such train and aircraft, other than the automobile. Further, as to the detection target, in addition to detecting the faces and postures of the drivers or pilots of the movable apparatuses, the state of passengers in the passenger seats and the state of inside the vehicle other than the passenger seats can be detected.

Further, as similar to the application example of FIG. 25, the detection apparatus 50 can be used for authenticating the driver. For example, when the driver 65 is detected by using the detection apparatus 50, the detection apparatus 50 can be used to perform given controls, such as allowing the engine to start or allowing the door lock to be locked or unlocked only when the detected driver 65 matches the driver information registered in advance.

Figure 27:
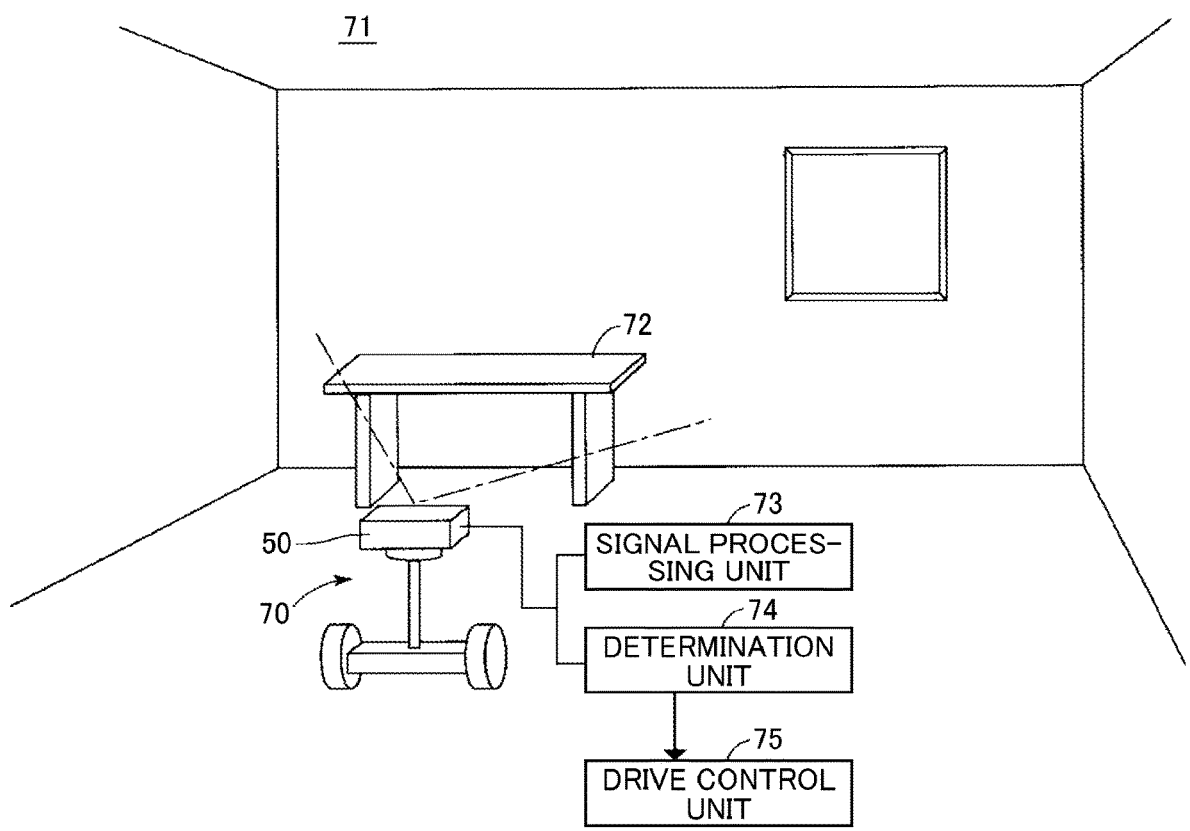
FIG. 27 illustrates another application example using a detection apparatus according to an embodiment applied for an autonomous traveling system of a movable apparatus.

FIG. 27 illustrates another application example using the detection apparatus 50 applied for an autonomous traveling system of movable apparatus. Different from the application example of FIG. 26, as to the application example of FIG. 27, the detection apparatus 50 is used for sensing one or more objects outside the moveable apparatus 70. The movable apparatus 70 is an autonomous traveling movable apparatus capable of automatically traveling while recognizing an external environmental situation.

The detection apparatus 50 is mounted on the movable apparatus 70, and the detection apparatus 50 irradiates the light toward the moving direction of the movable apparatus 70 and the surrounding area of the movable apparatus 70.

In a room 71, which is the moving area of the movable apparatus 70, a desk 72 is disposed in the moving direction of the movable apparatus 70. Among the light projected from the light source device 11 of the detection apparatus 50 mounted on the mobile 70, the light reflected from the desk 72 and around the desk 72 is received by the light-receiving element 13 of the detection apparatus 50, and then the electric signals converted by the photoelectric conversion are transmitted to the signal processing unit 73.

Then, the signal processing unit 73 calculates information related to a layout of the room 71, such as the distance to the desk 72, the position of the desk 72, and the surrounding conditions other than the desk 72, based on the electrical signals received from the light-receiving element 13. Based on the calculated information, the determination unit 74 determines the moving path and the moving speed of the movable apparatus 70, and then the drive control unit 75 controls the traveling of the movable apparatus 70, such as operation of the motor, which is a driving source, based on the determination result of the determination unit 74.

As to the application example of FIG. 27, with respect to the layout detection of the room 71 by the detection apparatus 50, the effect similar to that of the detection apparatus 50 of FIG. 23 (improvement of detection precision) can be obtained. In particular, since the information of the room 71 can be detected in a wider range by projecting the light from the light source device 11 with a wider angle and uniform illuminance level, the amount of information for recognizing the room 71 becomes greater than the amount of information when the detection range is narrower, with which the precision of autonomous travelling of the movable apparatus 70 can be improved.

FIG. 27 is the application example of the detection apparatus 50 mounted on the autonomous-traveling type movable apparatus 70 that can travel in the room 71, but the detection apparatus 50 can be applied to any autonomous driving vehicle (so-called automatic driving vehicle) that can travel outdoors. Further, the detection apparatus 50 can be also applied to a driving assist system for any automobile operated by a driver, which is not an autonomous driving type. In this case, the detection apparatus 50 is used to detect the surrounding conditions of the movable apparatus to assist the driver's operation in response to the detected surrounding conditions.

In the conventional methods, the power consumption for driving the light source and the heat generation become greater, the field of view (FOV) becomes narrower, and the image acquisition time such as frames per second (FPS) becomes worse.

Specifically, in order to increase the light output of the illumination light source, a greater amount of current is applied, and thereby the power consumption and heat generation are increased. On the other hand, if the illuminance level on the surface of the target object is to be increased while the light output level of the illumination light source is kept constant, the light quantity per unit area on the surface of the target can be increased by narrowing the FOV (by limiting the irradiation range). However, if the FOV is set narrower, the sensing range of the TOF camera becomes narrower. Further, if the optical scanning unit, such as micro electro mechanical systems (MEMS) mirror, is used, the wider FOV can be sensed while the illuminance level is increased, but the image acquisition time (FPS) deteriorates due to the scanning speed (moving speed).

For example, the conventional range sensor selectively drives only the necessary minimum numbers of the light-emitting element and the light-receiving element to set only a portion of the illuminance area as the detection range of the range finding processing. Therefore, the other portion of the illuminance area not selected as the detection range of the range finding processing is not within the FOV, and thereby the FOV becomes narrower.

As to the above described embodiment, a detection apparatus and a detection method that can reduce power consumption and heat generation, secure wider field of view (FOV) and higher precision, and efficient image acquisition time (e.g., shorter image acquisition time), can be provided.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

For example, in the above-described embodiment, the light source device 11 employs vertical cavity surface emitting laser (VCSEL) as a plurality of light-emitting elements, but the light source device 11 can employ laser diode (LD) or light-emitting diode (LED) as the plurality of light-emitting elements. Further, the light source device 11 can employ edge emitting laser (EEL) as the plurality of light-emitting elements. Further, the light source may be a single light source, or a plurality of light sources (e.g., VCSEL-array light source) that emit light concurrently. As described above, the VCSEL is advantageous in terms of easiness of two-dimensional arrangement and higher degree of freedom of the arrangement of the plurality of light-emitting regions. However, even if any light source other than the VCSEL is used, by setting a given arrangement for each light-emitting element and a given emission amount of the light-emitting element appropriately, the effect similar to that of the above described embodiment can be obtained.

For example, in the above described embodiment, the "control unit" that performs the integrating or synthesizing processing is described as the component of the signal control circuit 17, but the "control unit" that performs the integrating or synthesizing can be a component separately set from the signal control circuit 17. In any of forms of the embodiment, the control unit (e.g., signal control circuit 17) is implemented with hardware resources, such as central processing unit (CPU) and memory. Further, various software processing performed by the control unit (e.g., signal control circuit 17) is implemented by executing one or more programs.

Further, in FIGS. 15, 16, and 19, two illuminance regions, the left and right regions, are set as the plurality of illuminance regions, but the number of multiple illuminance regions is not limited thereto, but various design changes can be made.

Each function of the above-described embodiment can be implemented by one or more processing circuits. The "processing circuit" includes a processor which is programmed to perform each function by software such as a processor implemented by an electronic circuit, and device designed to perform each function described above, such as application specific integrated circuit (ASIC), digital signal processor (DSP), field programmable gate array (FPGA), conventional circuit module, or the like.

What is claimed is:

1. A detection apparatus comprising:
a light source device, including a plurality of light-emitting elements, configured to irradiate light onto a detection target by dividing an illuminance area into a plurality of illuminance regions; and
circuitry configured to
switch an illuminance level at each of the plurality of illuminance regions with a plurality of illuminance levels;
detect a plurality of detection data of the detection target at the plurality of illuminance regions by switching the illuminance level at each of the plurality of illuminance regions with the plurality of illuminance levels when irradiating the light onto the detection target; and
synthesize the plurality of detection data of the detection target.

2. The detection apparatus according to claim 1,
wherein the circuitry switches the illuminance level at each of the plurality of illuminance regions at least between a high illuminance level and a low illuminance level, and
wherein the circuitry switches the illuminance level at each of the plurality of illuminance regions at least between the high illuminance level and the low illuminance level to detect high illuminance detection data and low illuminance detection data of the detection target, and synthesizes the high illuminance detection data and the low illuminance detection data of the detection target.

3. The detection apparatus according to claim 2,
wherein the circuitry sets a weight on the high illuminance detection data before synthesizing the high illuminance detection data and the low illuminance detection data.

4. The detection apparatus according to claim 1,
wherein the light source device divides the illuminance area into the plurality of illuminance regions according to the number of the plurality of light-emitting elements.

5. The detection apparatus according to claim 1,
wherein the circuitry adjusts an amount of current applied to the plurality of light-emitting elements to switch the illuminance level at each of the plurality of illuminance regions with the plurality of illuminance levels.

6. The detection apparatus according to claim 1,
wherein the circuitry synthesizes the plurality of detection data related to the detection target to acquire synthesized detection data on the detection target.

7. The detection apparatus according to claim 6,
wherein the light source device includes a light-projection optical system configured to project light from the plurality of light-emitting elements toward the detection target, wherein the light-projection optical system includes one of a refraction optical system, a diffractive optical element, and a diffusion plate.

8. The detection apparatus according to claim 1, wherein the light source device includes the plurality of light-emitting elements using any one of vertical cavity surface emitting laser (VCSEL), laser diode (LD), and light-emitting diode (LED).

9. A method of detecting an object comprising:
irradiating light onto a detection target using a light source device including a plurality of light-emitting elements by dividing an illuminance area into a plurality of illuminance regions;
switching an illuminance level at each of the plurality of illuminance regions with a plurality of illuminance levels;
detecting a plurality of detection data of the detection target at the plurality of illuminance regions by switching the illuminance level at each of the plurality of illuminance regions with the plurality of illuminance levels when irradiating the light onto the detection target; and
synthesizing the plurality of detection data of the detection target.

* * * * *